(12) United States Patent
Kodaira

(10) Patent No.: US 10,542,180 B2
(45) Date of Patent: Jan. 21, 2020

(54) SYSTEM, METHOD FOR PROCESSING INFORMATION, AND INFORMATION PROCESSING APPARATUS

(71) Applicant: Itaru Kodaira, Kanagawa (JP)

(72) Inventor: Itaru Kodaira, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/740,249

(22) PCT Filed: Aug. 15, 2016

(86) PCT No.: PCT/JP2016/003744
§ 371 (c)(1),
(2) Date: Dec. 27, 2017

(87) PCT Pub. No.: WO2017/029806
PCT Pub. Date: Feb. 23, 2017

(65) Prior Publication Data
US 2018/0191924 A1    Jul. 5, 2018

(30) Foreign Application Priority Data

Aug. 18, 2015  (JP) ................................. 2015-161433

(51) Int. Cl.
*H04N 1/42* (2006.01)
*G06F 17/30* (2006.01)
(Continued)

(52) U.S. Cl.
CPC ............. *H04N 1/42* (2013.01); *G06F 16/219* (2019.01); *G06F 16/245* (2019.01);
(Continued)

(58) Field of Classification Search
CPC .. H04N 1/42; H04N 1/00209; H04N 1/00244; H04N 1/00474; H04N 1/00962;
(Continued)

(56) References Cited

U.S. PATENT DOCUMENTS

| | | | | |
|---|---|---|---|---|
| 6,952,717 B1 * | 10/2005 | Monchilovich | ........ | G06Q 10/04 707/999.201 |
| 2001/0025306 A1 * | 9/2001 | Ninokata | ................ | H04L 29/06 709/218 |

(Continued)

FOREIGN PATENT DOCUMENTS

| | | |
|---|---|---|
| JP | 2000-242463 A | 9/2000 |
| JP | 2003-85085 A | 3/2003 |

(Continued)

OTHER PUBLICATIONS

Extended European Search Report dated Apr. 24, 2018 in Patent Application No. 16836800.9, 8 pages.

(Continued)

*Primary Examiner* — Iriana Cruz
(74) *Attorney, Agent, or Firm* — Oblon, McClelland, Maier & Neustadt, L.L.P.

(57) ABSTRACT

A system includes a storage unit that stores history information associating a device executed processing and processed data with each other, a screen display unit that displays a screen in which at least one piece of history information is displayed and that is used for causing the device to execute processing based on the history information selected from the displayed at least one piece of history information, a generating unit that generates instruction information for instructing the device to execute the processing of data corresponding to the history information, a processing executing unit that executes the processing of the data based on the instruction information, and a recording unit that records the device that executed the processing and the processed data in the storage unit as the history information based on the instruction information for instructing the processing of the data executed by the processing executing unit.

17 Claims, 31 Drawing Sheets

| HISTORY ID | CONFER-ENCE ID | DATE AND TIME | USER NAME | DOCUMENT/ IMAGE FILE PATH | DEVICE INFORMATION | PROCESSING INFORMATION | |
|---|---|---|---|---|---|---|---|
| 00001 | 1111 | 01/31 12:12:00 | aaa | /xxx/yyy.png | WHITEBOARD 1 | WHITEBOARD IMAGE STORAGE | HISTORY INFORMATION |
| 00002 | 1111 | 01/31 12:12:40 | bbb | /xxx/yyy.png | PROJECTOR 1 | PROJECTION | HISTORY INFORMATION |
| 00003 | 1112 | 02/01 14:11:11 | ccc | /xxa/aaa.tif | SCANNER 1 | SCAN INPUT | HISTORY INFORMATION |
| 00004 | 1112 | 02/01 14:11:14 | aaa | /xxa/aaa.tif | PLOTTER 1 | PRINT OUT | HISTORY INFORMATION |
| 00005 | 1112 | 02/01 15:00:22 | bbb | /xxa/bbb.doc | SMART DEVICE 1 | FILE UPLOAD | HISTORY INFORMATION |

(51) Int. Cl.
*H04N 1/00* (2006.01)
*H04N 1/21* (2006.01)
*G06F 16/21* (2019.01)
*G06F 16/245* (2019.01)
*G06F 16/58* (2019.01)

(52) U.S. Cl.
CPC ..... *G06F 16/5866* (2019.01); *H04N 1/00244* (2013.01); *H04N 1/00474* (2013.01); *H04N 1/00962* (2013.01); *H04N 1/2104* (2013.01)

(58) Field of Classification Search
CPC ............... H04N 1/2104; H04N 1/2179; G06F 17/30011; G06F 17/30265; G06F 17/03268; G06F 17/30309; G06F 17/30424; G06Q 10/10
See application file for complete search history.

(56) References Cited

U.S. PATENT DOCUMENTS

| | | | |
|---|---|---|---|
| 2006/0234393 A1 | 10/2006 | Bhattacharyya | |
| 2008/0178268 A1 | 7/2008 | Kodaira | |
| 2009/0094694 A1 | 4/2009 | Kodaira | |
| 2010/0149575 A1* | 6/2010 | Ozawa | G06F 3/1203 358/1.13 |
| 2010/0253967 A1* | 10/2010 | Privault | G06F 16/58 358/1.15 |
| 2013/0077857 A1 | 3/2013 | Privault et al. | |
| 2015/0154718 A1 | 6/2015 | Fuse et al. | |
| 2015/0207833 A1* | 7/2015 | Tsubotani | G06F 3/04842 715/753 |
| 2015/0249696 A1* | 9/2015 | Nagase | H04L 65/403 709/203 |
| 2015/0271353 A1 | 9/2015 | Nishimura et al. | |
| 2016/0212114 A1 | 7/2016 | Kuroyanagi et al. | |
| 2016/0274842 A1 | 9/2016 | Kuroyanagi et al. | |
| 2016/0277379 A1 | 9/2016 | Sasaki et al. | |

FOREIGN PATENT DOCUMENTS

| | | |
|---|---|---|
| JP | 2006-92339 A | 4/2006 |
| JP | 2010-141593 A | 6/2010 |
| JP | 2014-179001 A | 9/2014 |
| JP | 2014-212575 A | 11/2014 |
| JP | 2015-106340 A | 6/2015 |

OTHER PUBLICATIONS

International Search Report and Written Opinion dated Nov. 1, 2016 in PCT/JP2016/003744 filed on Aug. 15, 2016.

Notification of Reasons for Refusal dated Apr. 28, 2017 in Japanese Patent Application No. 2015-161433 filed on Aug. 18, 2015 (with English language machine translation).

Notification of Reasons for Refusal dated Oct. 4, 2017 in Japanese Patent Application No. 2015-161433 filed on Aug. 18, 2015 (with English language machine translation).

* cited by examiner

[Fig. 1]
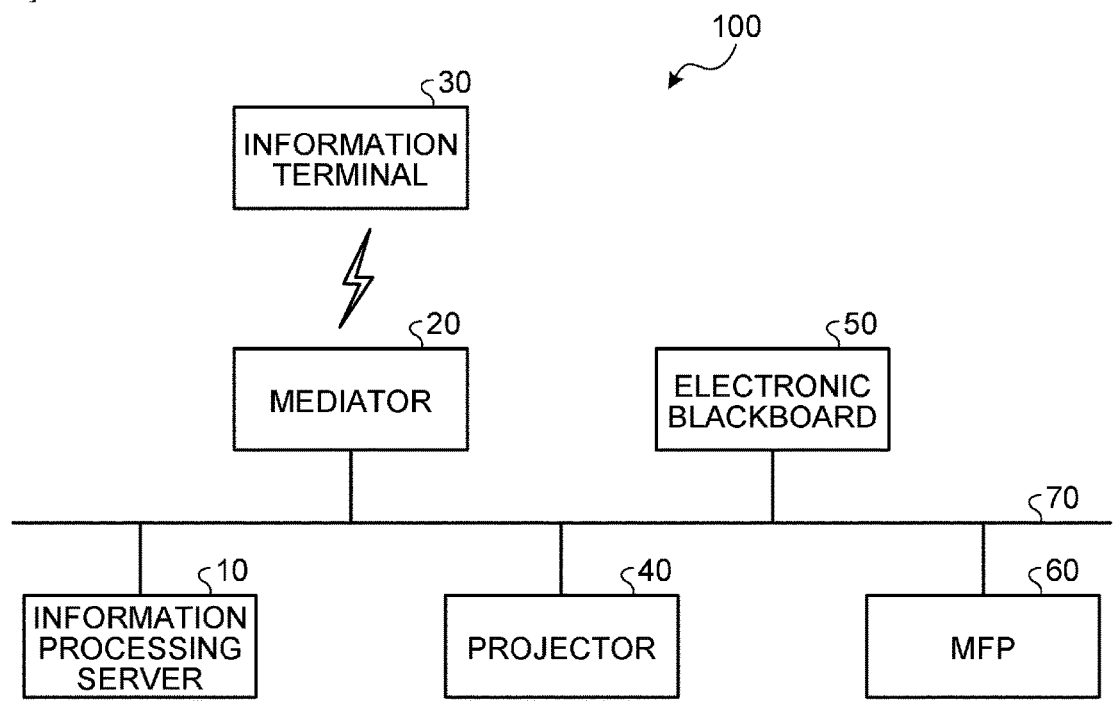
[Fig. 2]
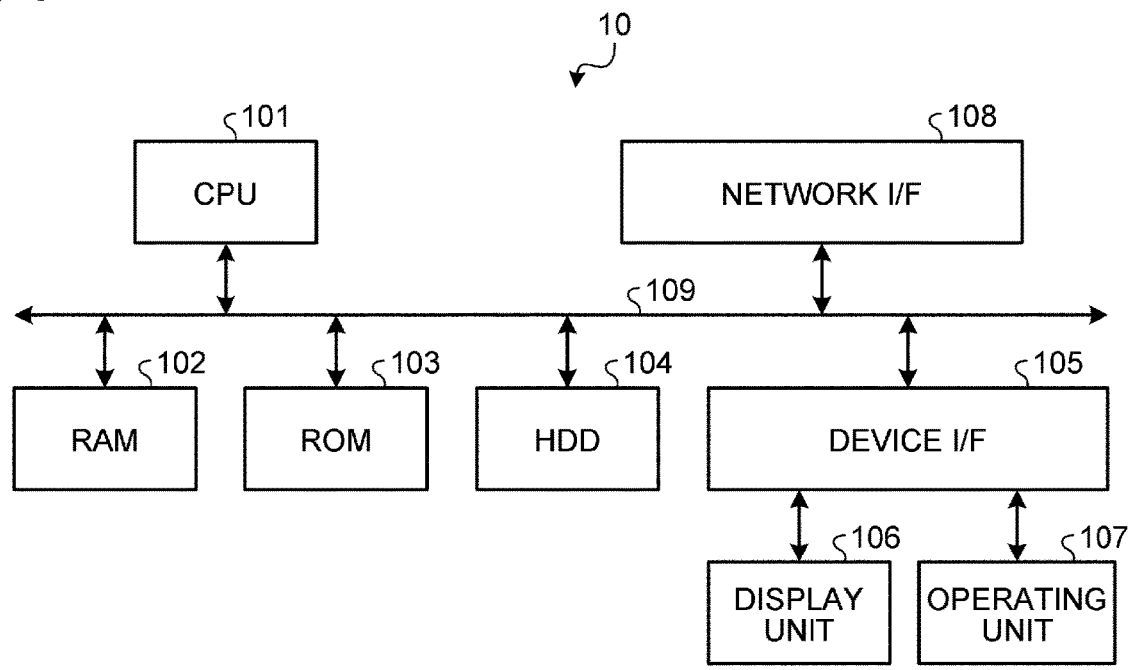

[Fig. 3]
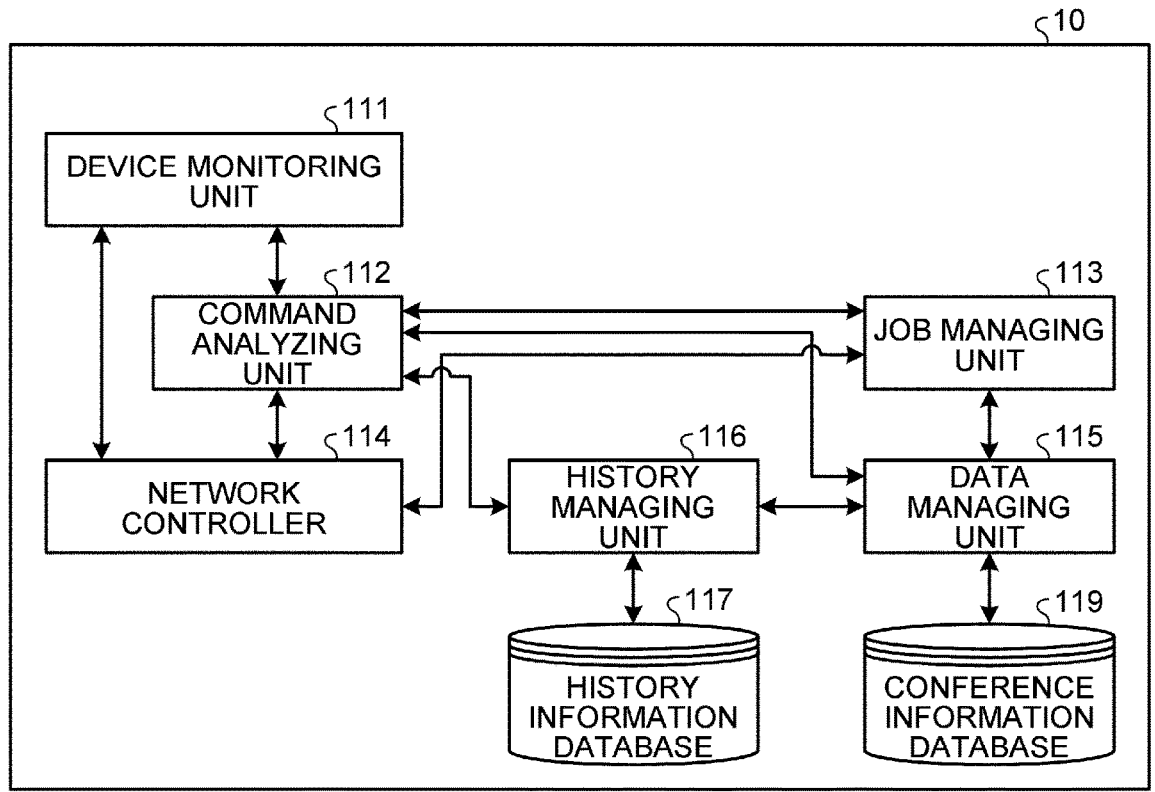
[Fig. 4]
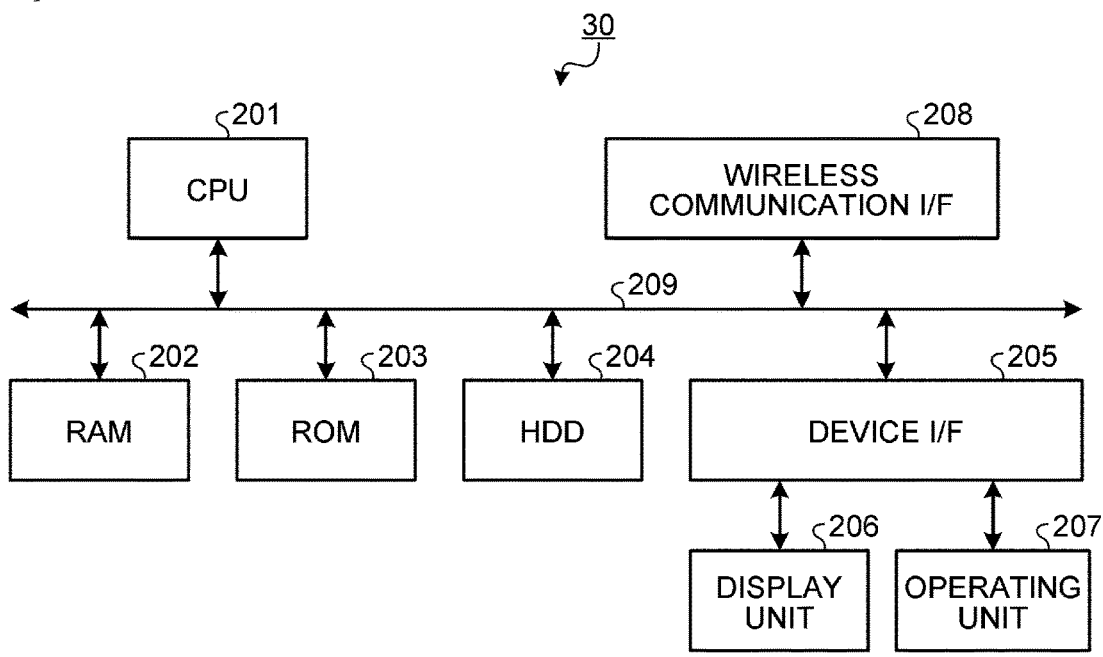

[Fig. 5]
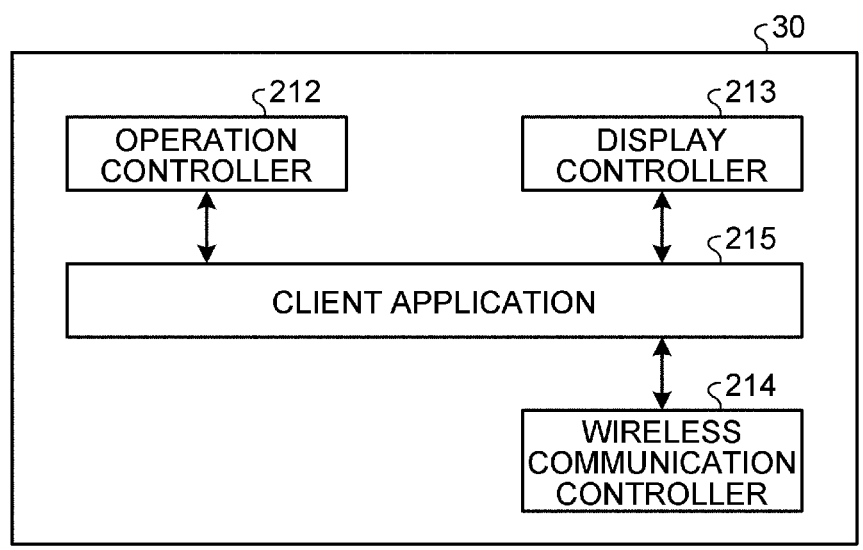
[Fig. 6]
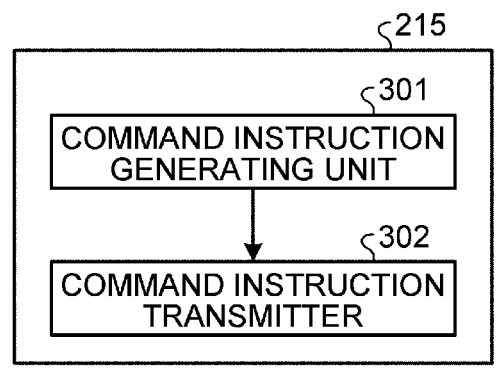

FIG.7

| HISTORY ID | CONFER- ENCE ID | DATE AND TIME | USER NAME | DOCUMENT/ IMAGE FILE PATH | DEVICE INFORMATION | PROCESSING INFORMATION | |
|---|---|---|---|---|---|---|---|
| 00001 | 1111 | 01/31 12:12:00 | aaa | /xxx/yyy.png | WHITEBOARD 1 | WHITEBOARD IMAGE STORAGE | ← HISTORY INFORMATION |
| 00002 | 1111 | 01/31 12:12:40 | bbb | /xxx/yyy.png | PROJECTOR 1 | PROJECTION | ← HISTORY INFORMATION |
| 00003 | 1112 | 02/01 14:11:11 | ccc | /xxa/aaa.tif | SCANNER 1 | SCAN INPUT | ← HISTORY INFORMATION |
| 00004 | 1112 | 02/01 14:11:14 | aaa | /xxa/aaa.tif | PLOTTER 1 | PRINT OUT | ← HISTORY INFORMATION |
| 00005 | 1112 | 02/01 15:00:22 | bbb | /xxa/bbb.doc | SMART DEVICE 1 | FILE UPLOAD | ← HISTORY INFORMATION |

[Fig. 8]
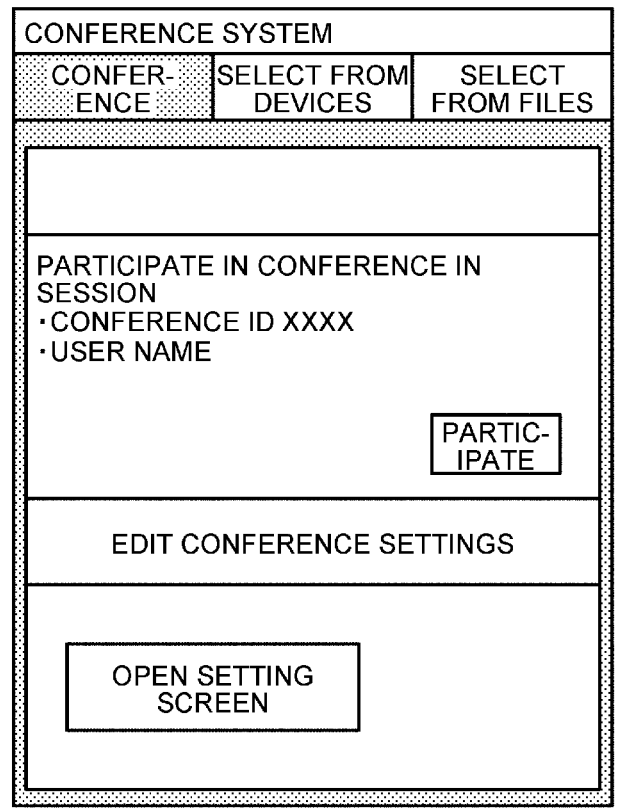
[Fig. 9]
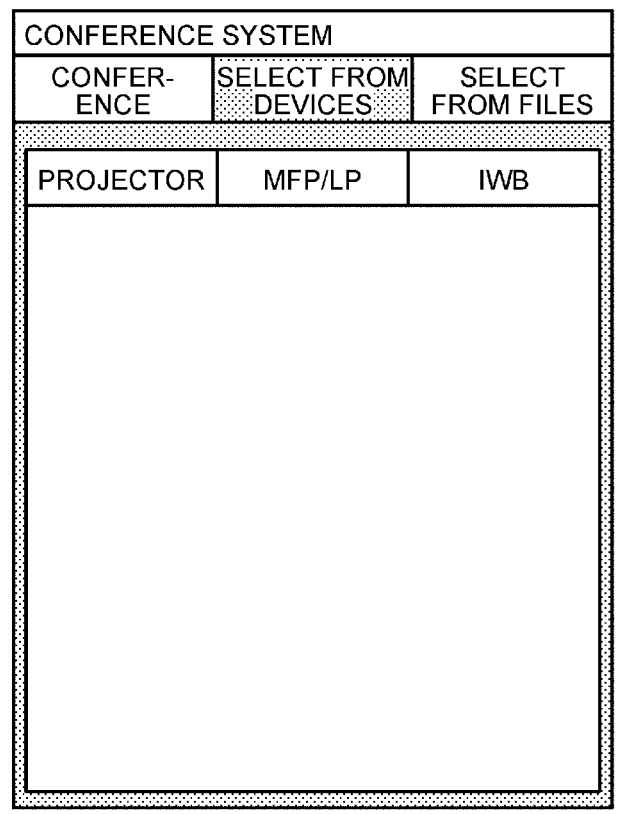

[Fig. 10]
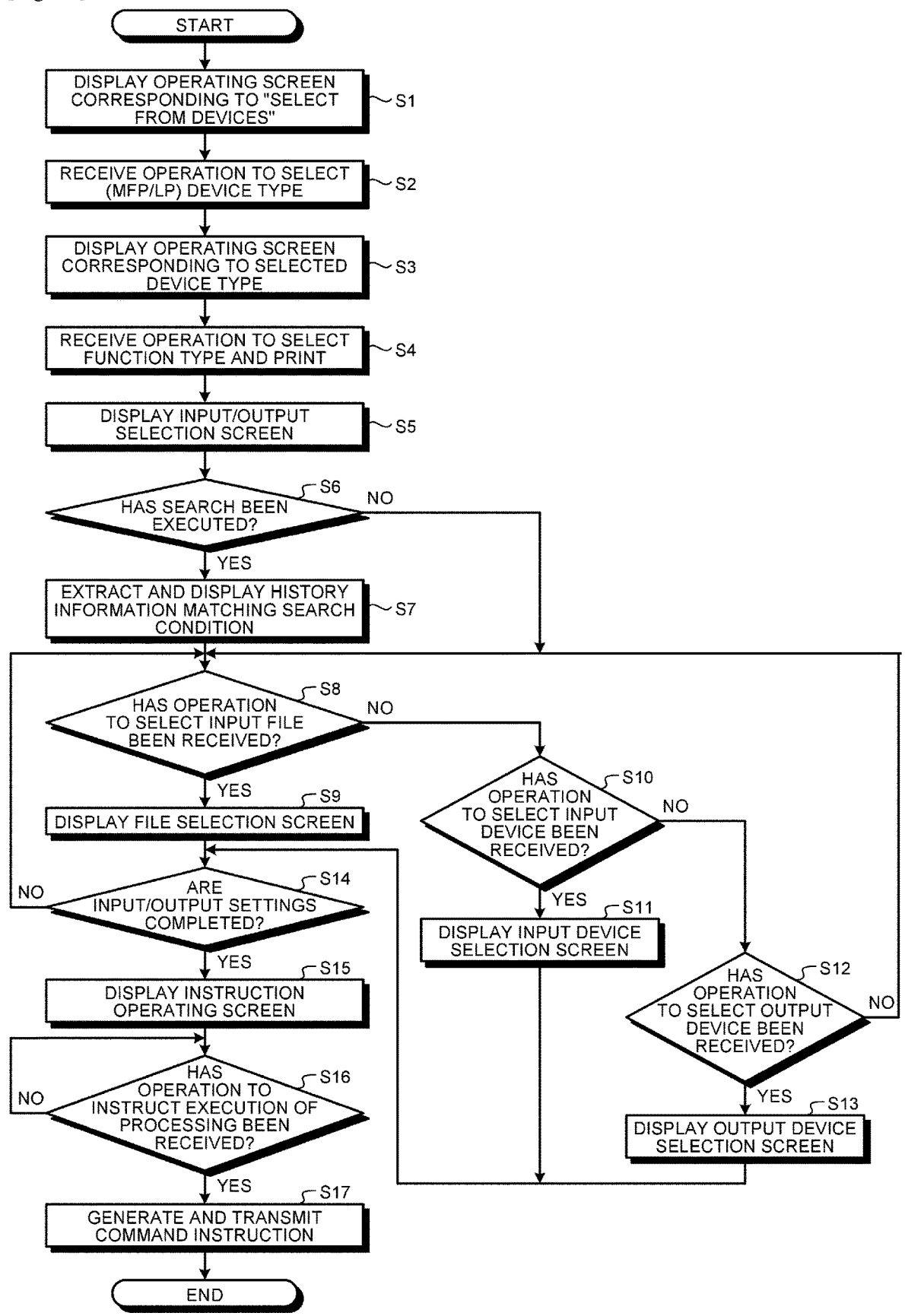

[Fig. 11]
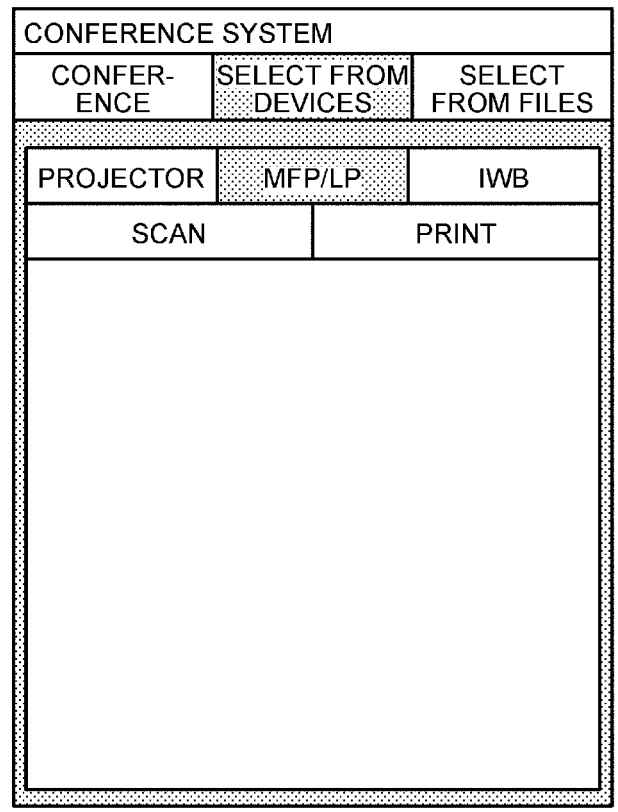
[Fig. 12]
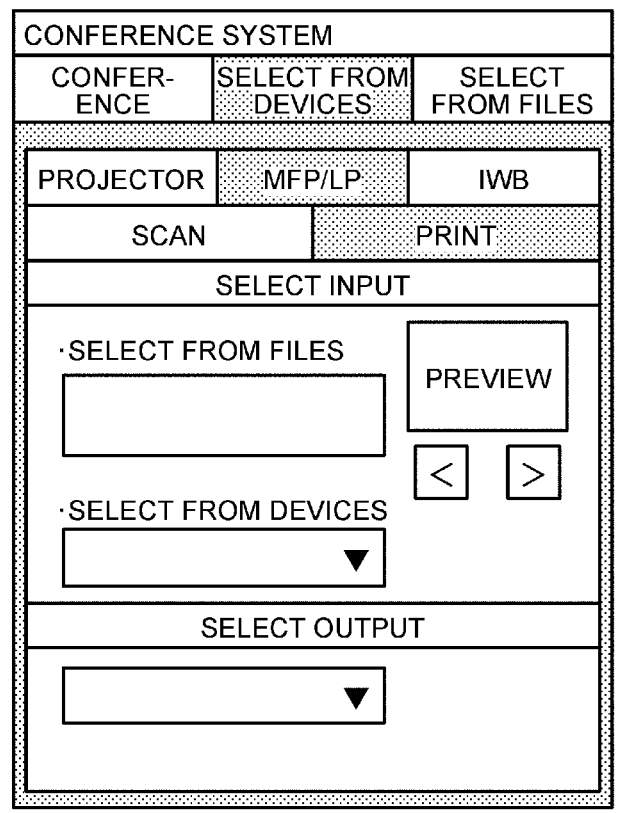

[Fig. 13]
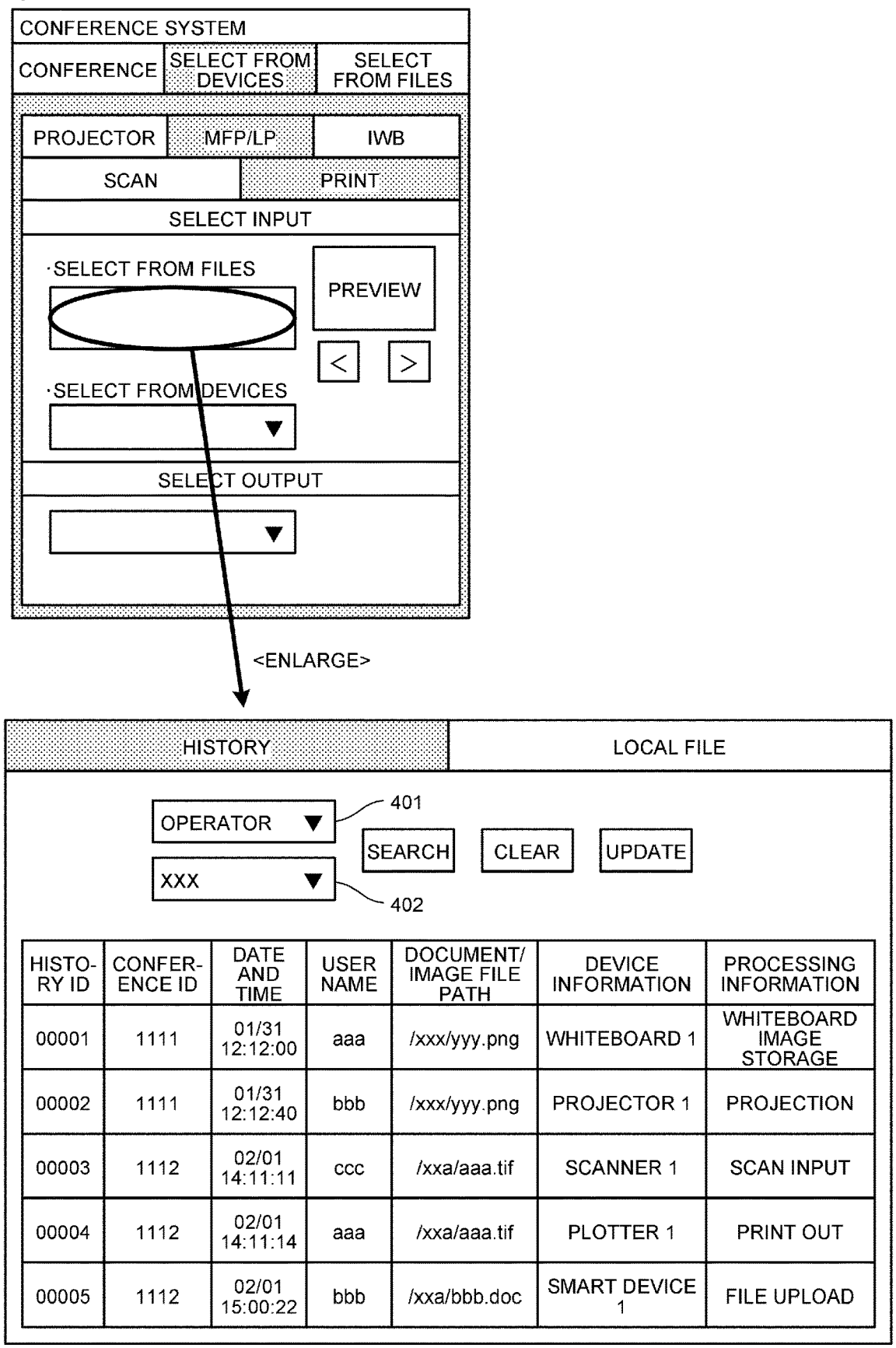

[Fig. 14]
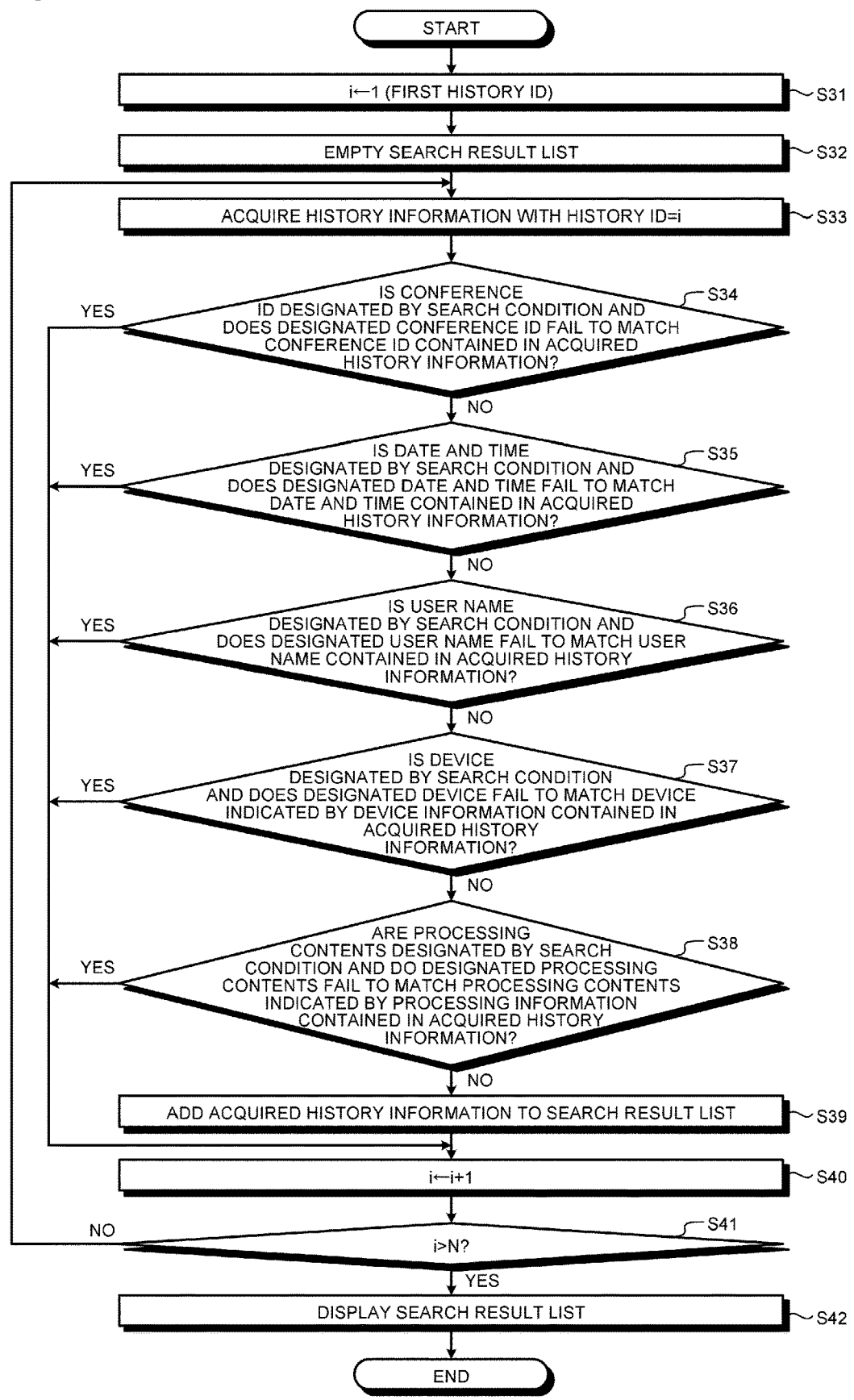

FIG.15

| CONFER-ENCE ID | DATE AND TIME | USER NAME | DOCUMENT/ IMAGE FILE PATH | DEVICE INFORMATION | PROCESSING INFORMATION |
|---|---|---|---|---|---|
| 1111 | 01/31 12:12:00 | aaa | /xxx/yyy.png | PROJECTOR 1 | PROJECTION |
| 1111 | 01/31 12:12:40 | bbb | /xxx/zzz.jpg | PROJECTOR 2 | PROJECTION |
| 1111 | 01/31 12:30:11 | ccc | /xxx/aaa.ppt | PROJECTOR 2 | PROJECTION |

[Fig. 16]
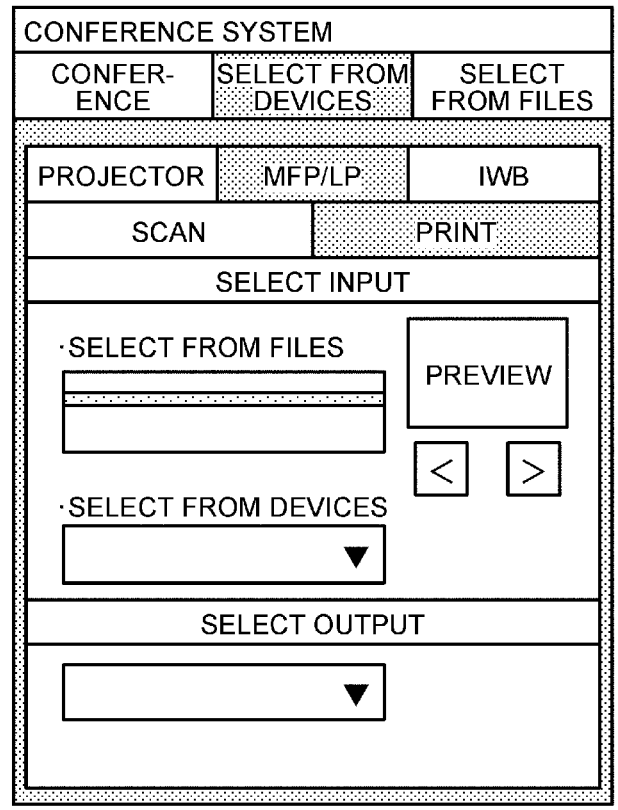
[Fig. 17]
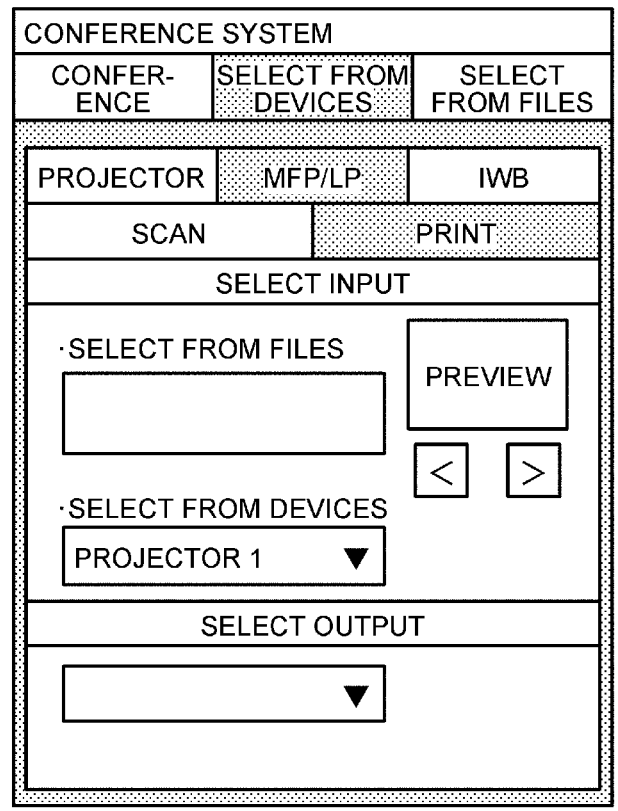

[Fig. 18]
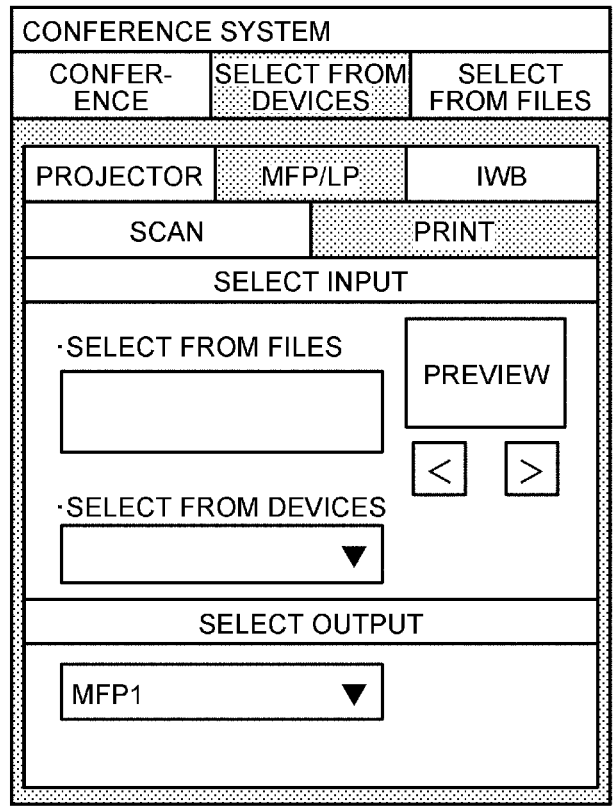
[Fig. 19A]
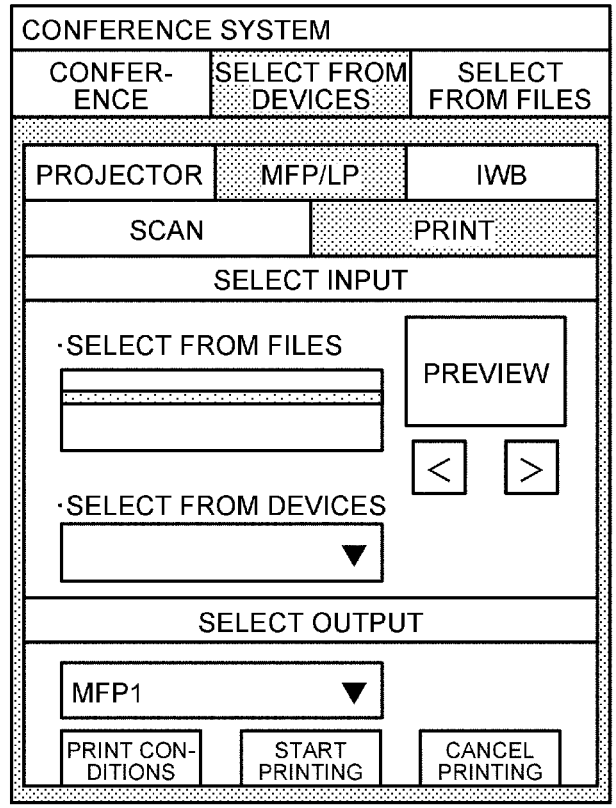

[Fig. 19B]
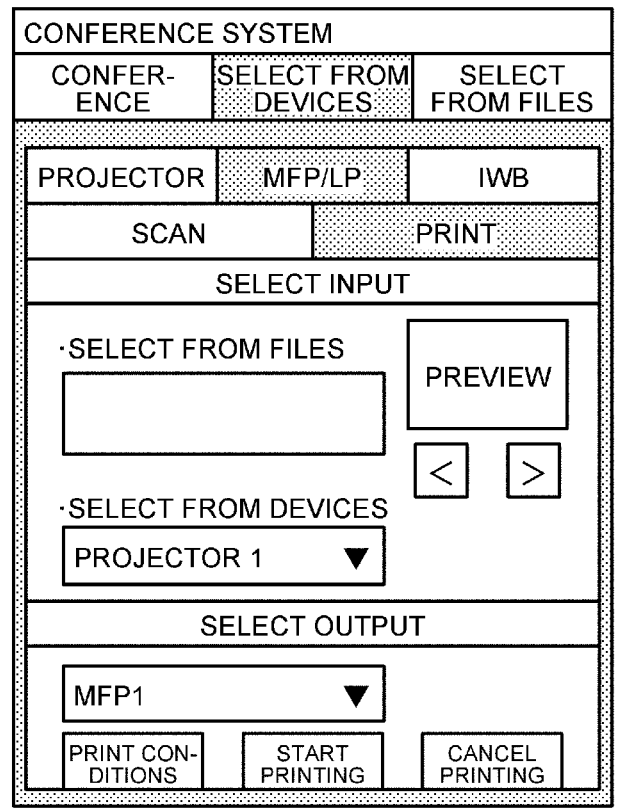
[Fig. 20]
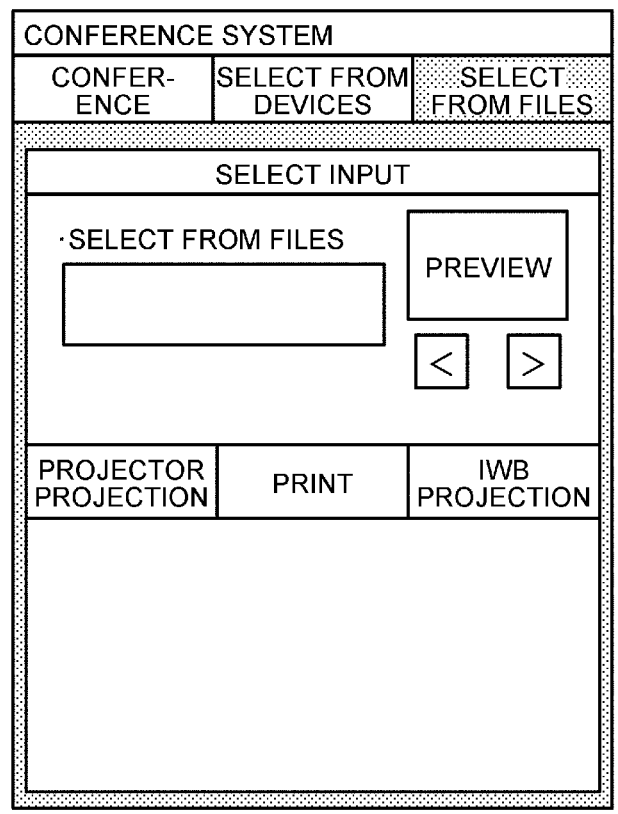

[Fig. 21]
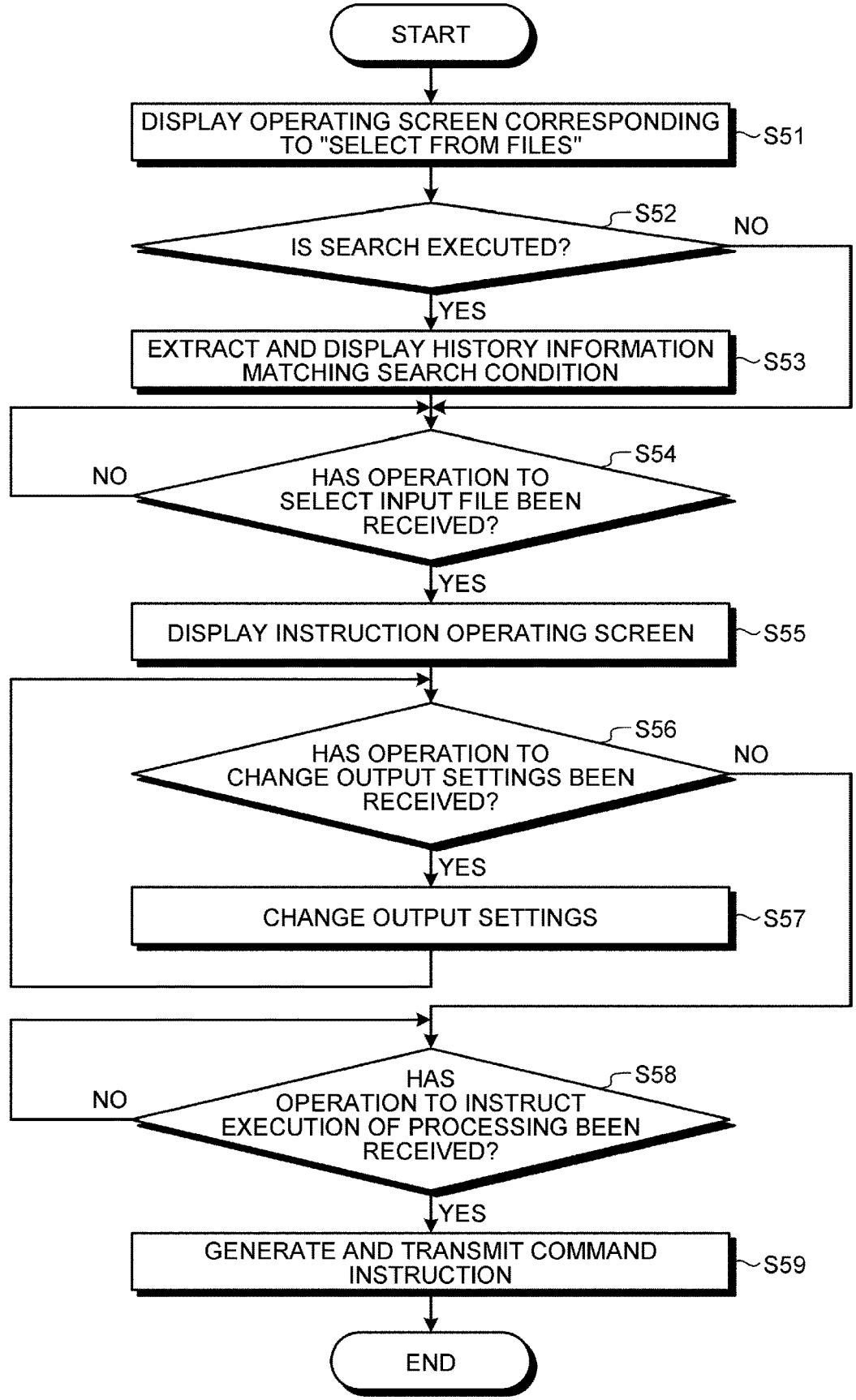

[Fig. 22]
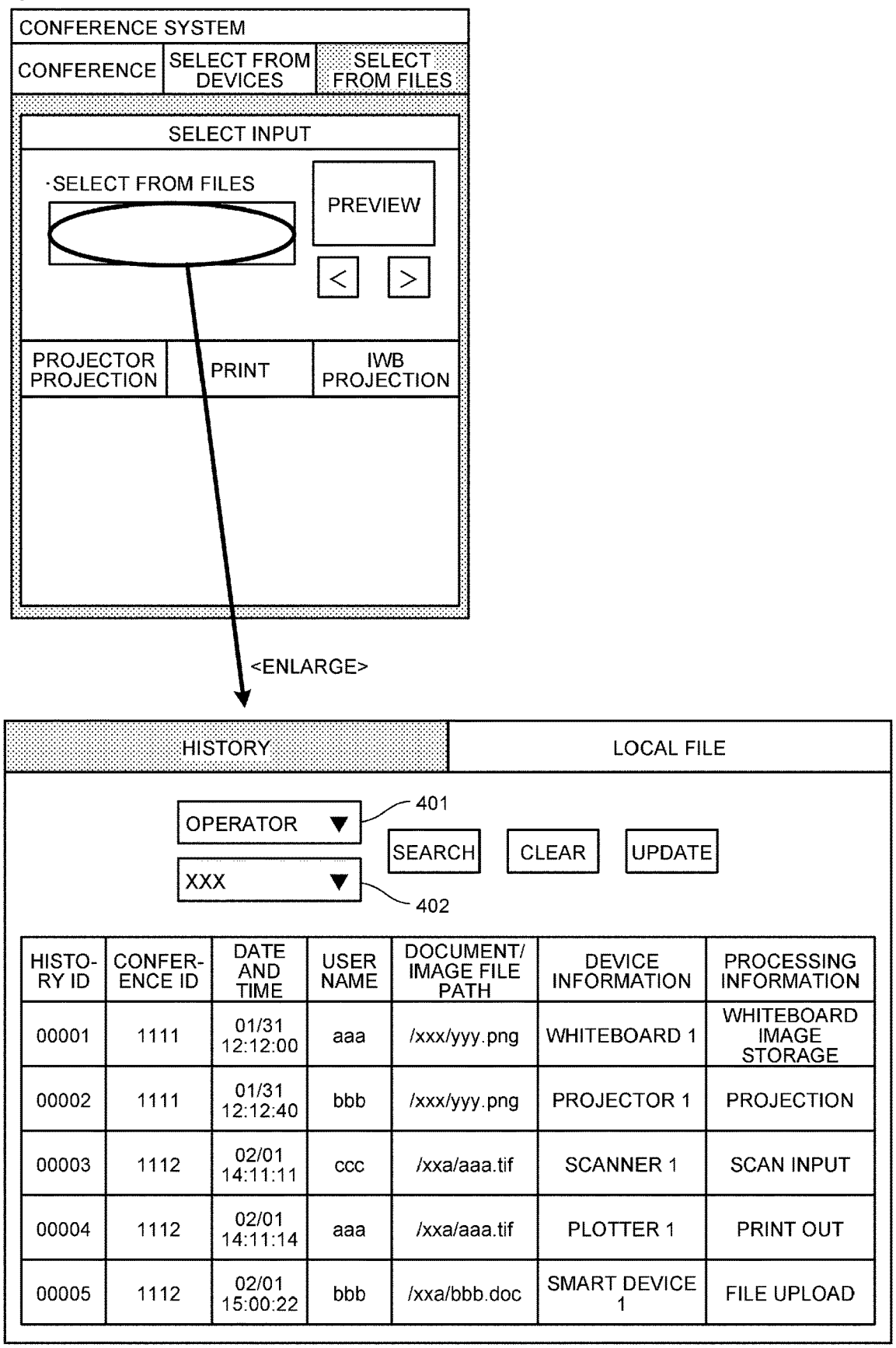

[Fig. 23]
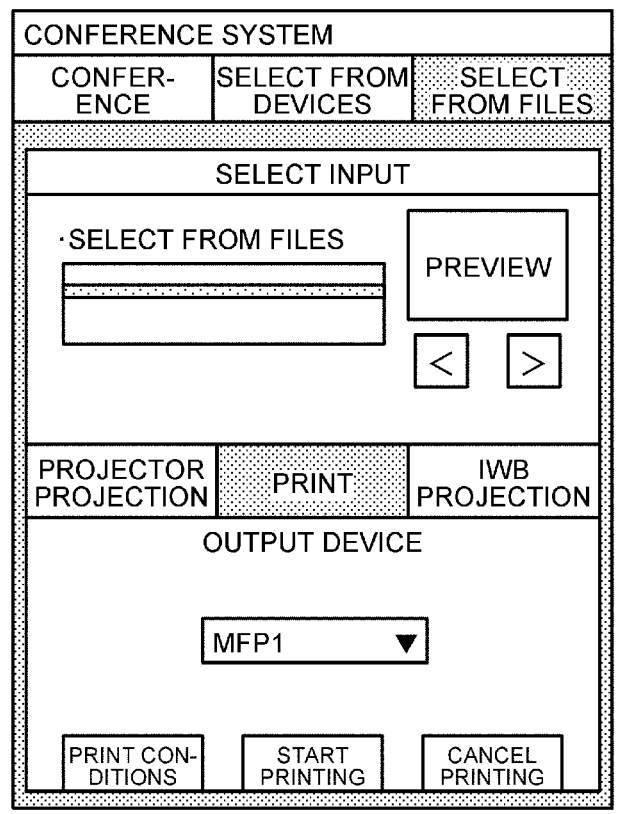
[Fig. 24]
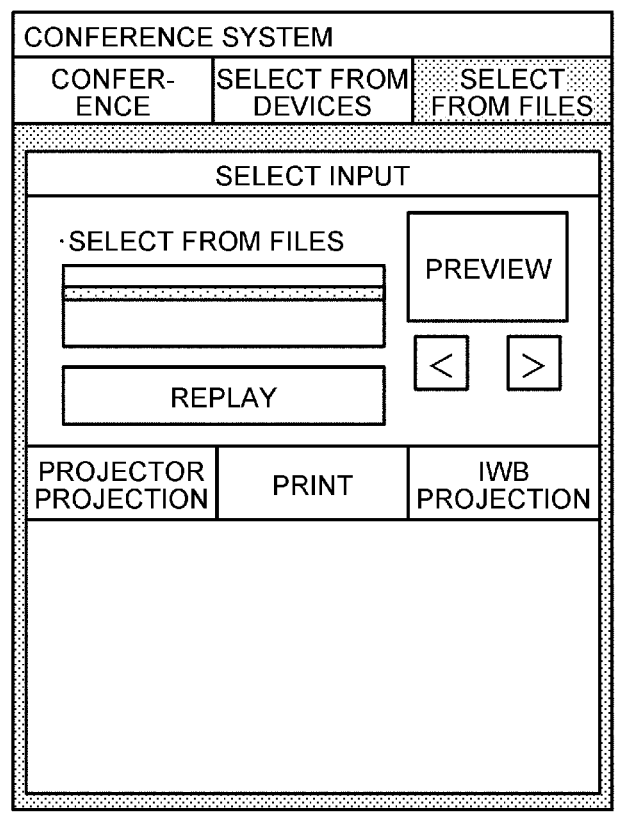

[Fig. 25]
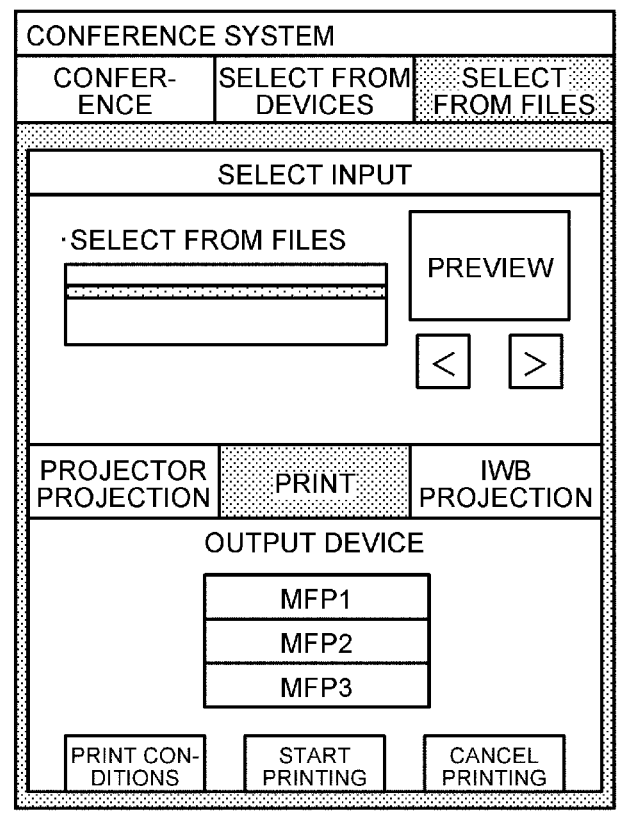

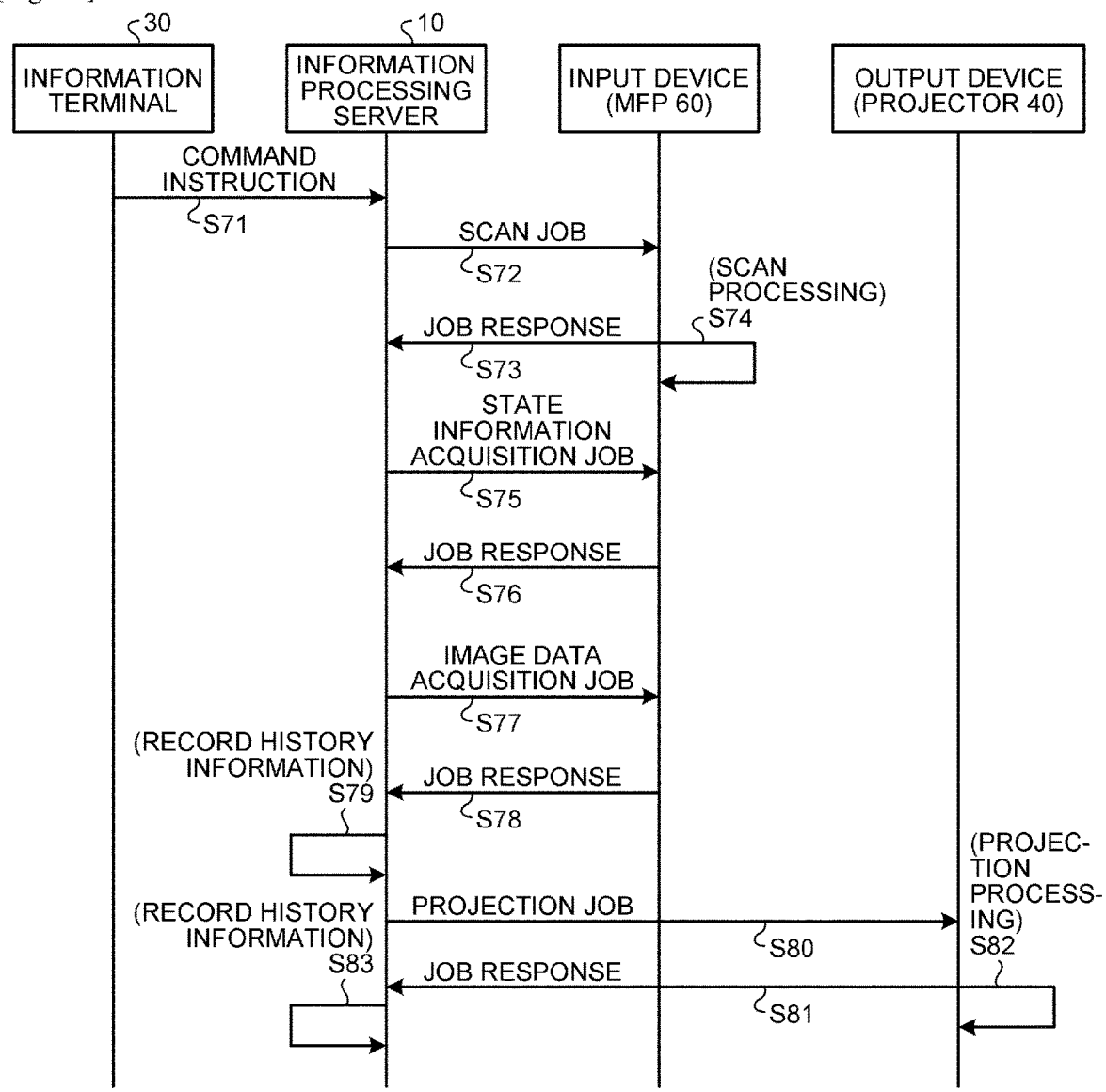

FIG.27

| HISTORY ID | CONFER-ENCE ID | DATE AND TIME | USER NAME | DOCUMENT/ IMAGE FILE PATH | DEVICE INFORMATION | PROCESSING INFORMATION | FINAL RESULT INFORMATION |
|---|---|---|---|---|---|---|---|
| 00001 | 1111 | 01/31 12:01:00 | aaa | /xxx/p1.png | WHITEBOARD 1 | WHITEBOARD IMAGE STORAGE | NF |
| 00002 | 1111 | 01/31 12:01:30 | aaa | /xxx/p2.png | WHITEBOARD 1 | WHITEBOARD IMAGE STORAGE | NF |
| 00003 | 1111 | 01/31 12:03:00 | aaa | /xxx/p3.png | WHITEBOARD 1 | WHITEBOARD IMAGE STORAGE | NF |
| 00004 | 1111 | 01/31 12:06:25 | aaa | /xxx/p4.png | WHITEBOARD 1 | WHITEBOARD IMAGE STORAGE | NF |
| 00005 | 1111 | 01/31 12:12:00 | aaa | /xxx/p5.png | WHITEBOARD 1 | WHITEBOARD IMAGE STORAGE | F |

[Fig. 28]
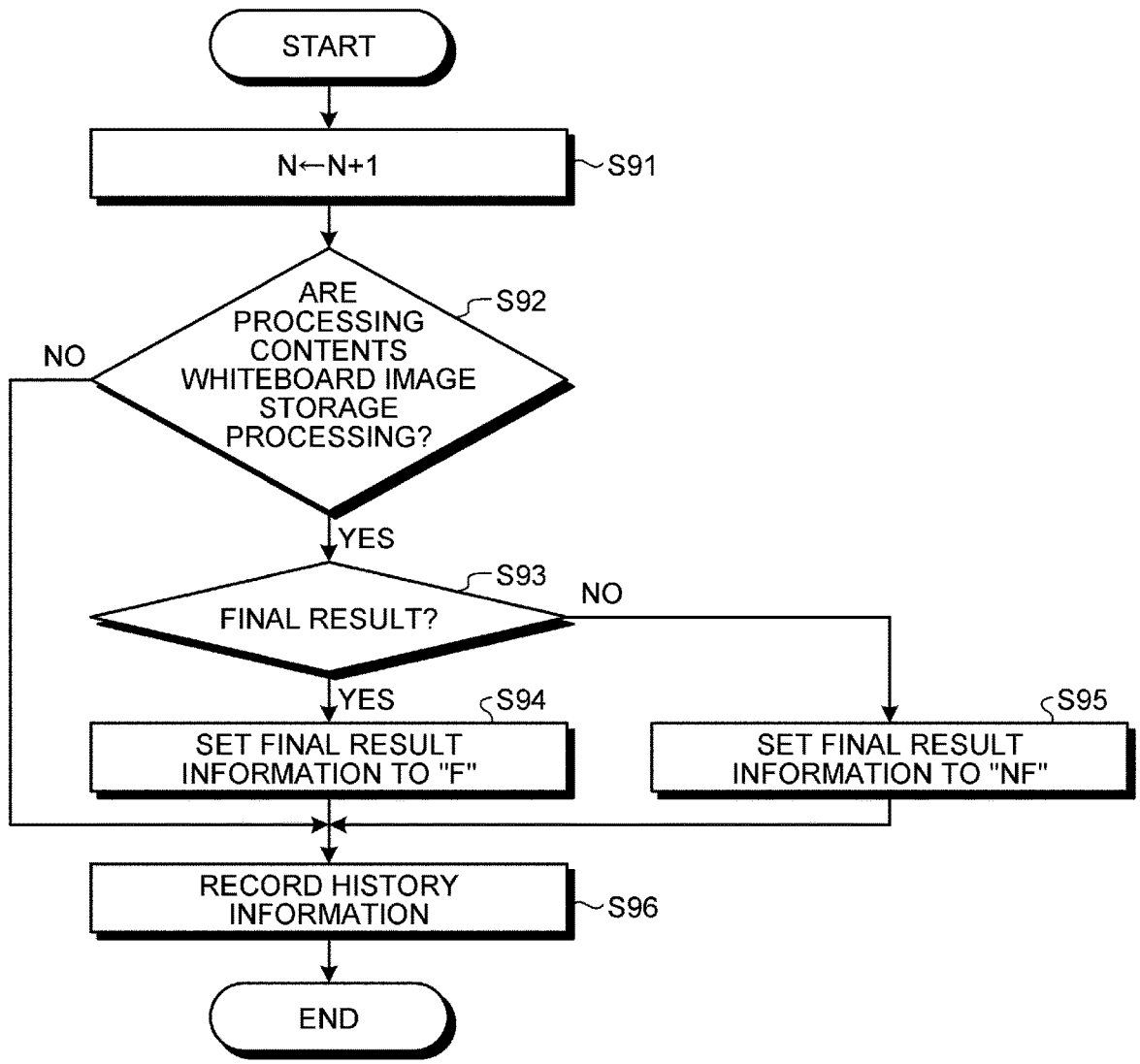

[Fig. 29]
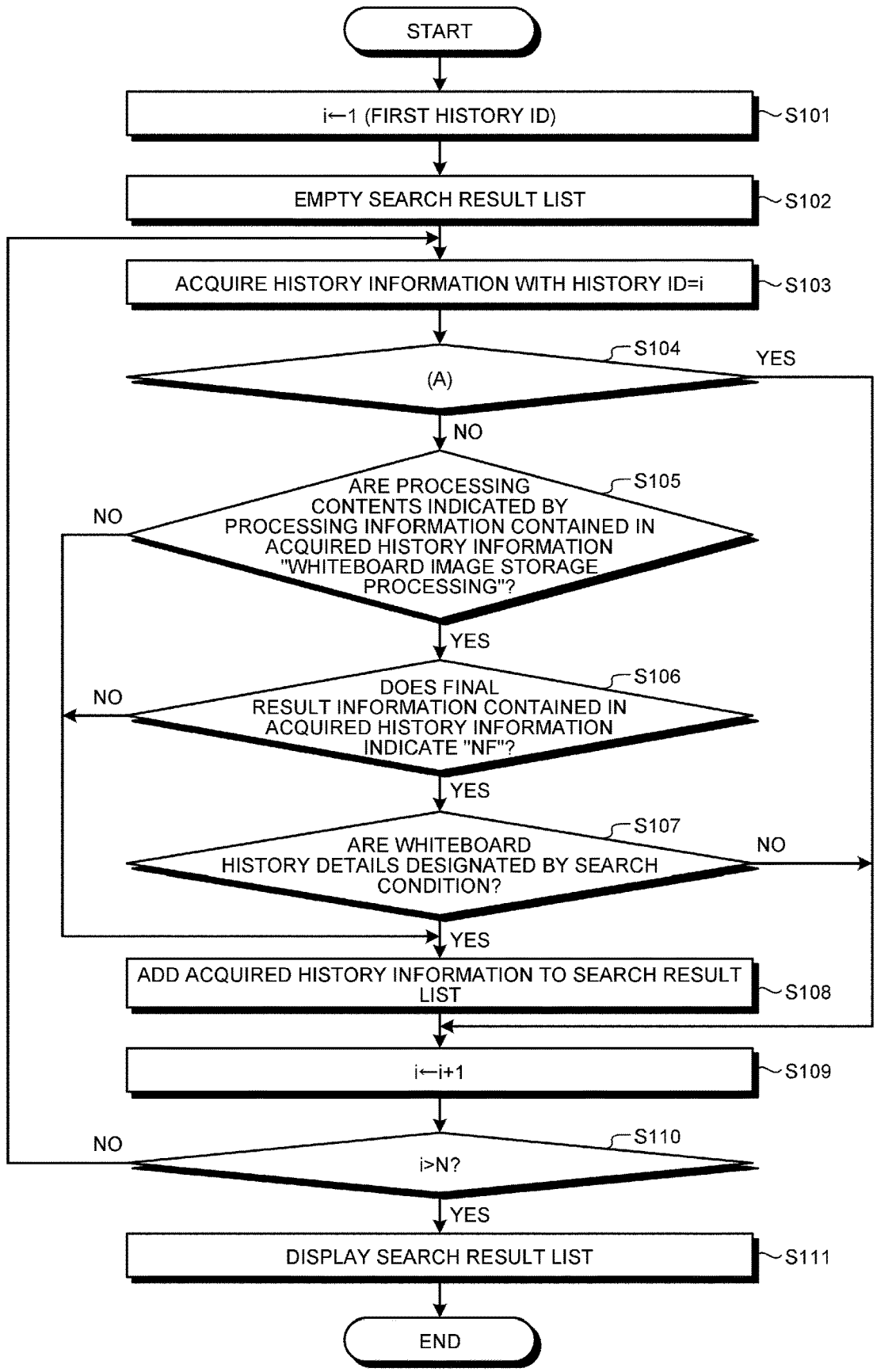

FIG.30

| HISTORY ID | CONFER-ENCE ID | DATE AND TIME | USER NAME | DOCUMENT/ IMAGE FILE PATH | DEVICE INFORMATION | PROCESSING INFORMATION | RELATED DOCUMENT INFORMATION |
|---|---|---|---|---|---|---|---|
| 00002 | 1111 | 01/31 12:10:00 | bbb | /xxx/doc.ppt | PROJECTOR 1 | PROJECTION | |
| 00003 | 1111 | 01/31 12:10:00 | bbb | /xxx/doc_p1.png | PROJECTOR 1 | PROJECTION | /xxx/doc.ppt |
| 00004 | 1111 | 01/31 12:11:13 | bbb | /xxx/doc_p2.png | PROJECTOR 1 | PROJECTION | /xxx/doc.ppt |
| 00005 | 1111 | 01/31 12:12:44 | bbb | /xxx/doc_p3.png | PROJECTOR 1 | PROJECTION | /xxx/doc.ppt |
| 00006 | 1111 | 01/31 12:15:32 | bbb | /xxx/doc_p4.png | PROJECTOR 1 | PROJECTION | /xxx/doc.ppt |

[Fig. 31]
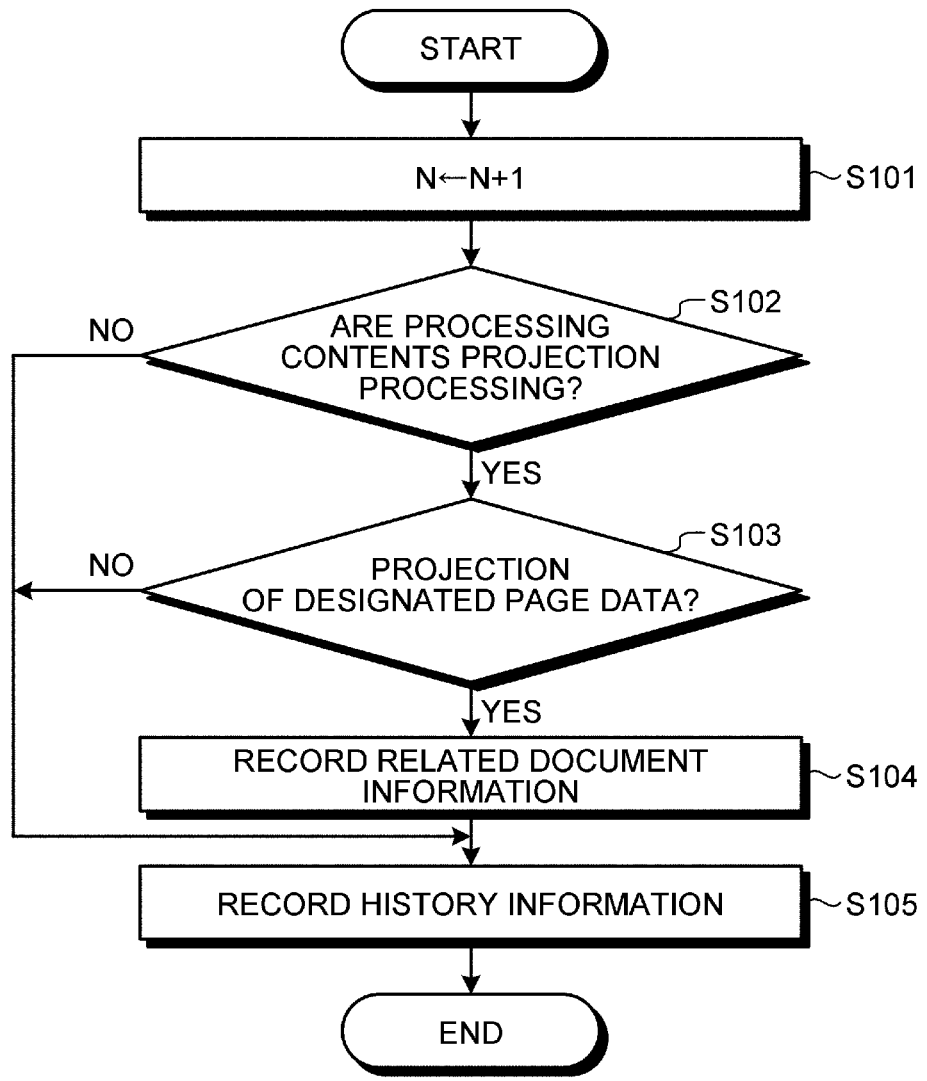

[Fig. 32]
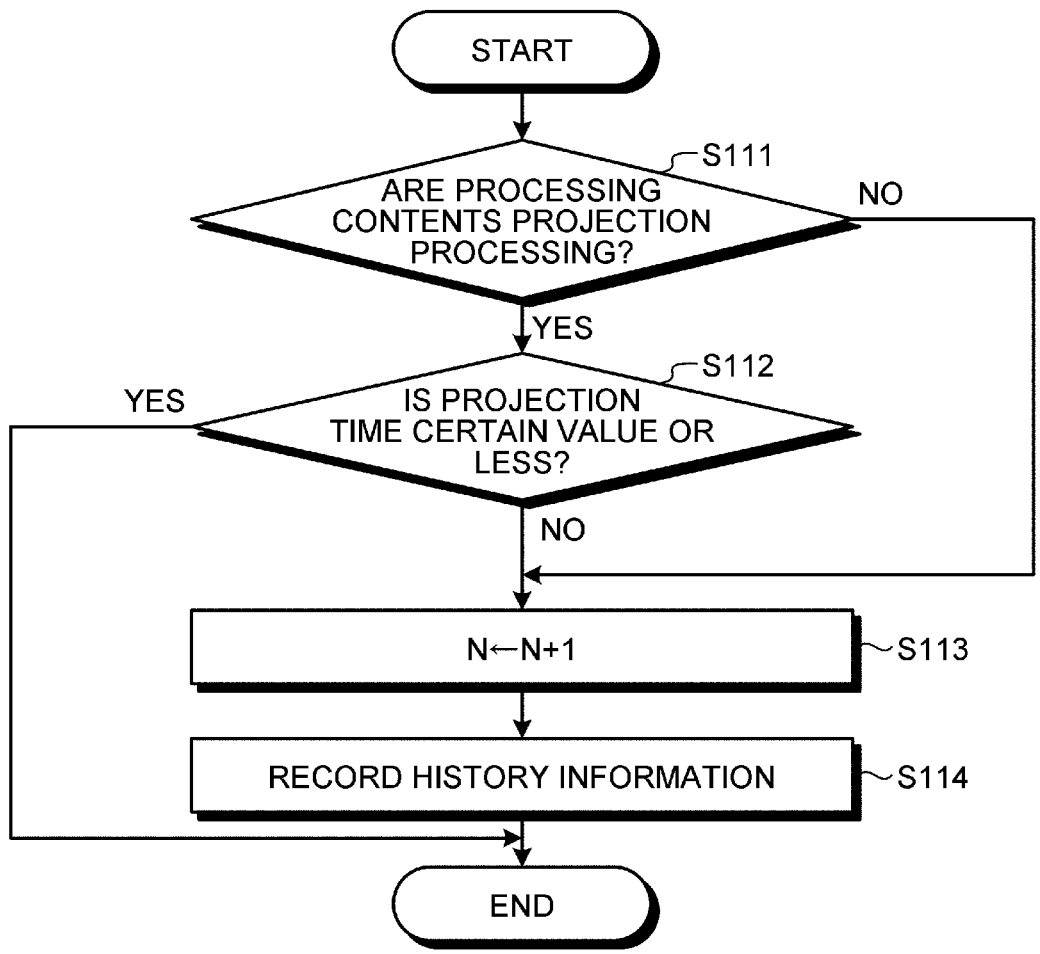

FIG.33

| HISTORY ID | CONFER-ENCE ID | DATE AND TIME | USER NAME | DOCUMENT/ IMAGE FILE PATH | DEVICE INFORMATION | PROCESSING INFORMATION | THRESHOLD INFORMATION |
|---|---|---|---|---|---|---|---|
| 00002 | 1111 | 01/31 12:10:00 | bbb | /xxx/doc_p1.png | PROJECTOR 1 | PROJECTION | ≤ |
| 00003 | 1111 | 01/31 12:10:03 | bbb | /xxx/doc_p2.png | PROJECTOR 1 | PROJECTION | > |
| 00004 | 1111 | 01/31 12:12:44 | bbb | /xxx/doc_p3.png | PROJECTOR 1 | PROJECTION | ≤ |
| 00005 | 1111 | 01/31 12:12:46 | bbb | /xxx/doc_p4.png | PROJECTOR 1 | PROJECTION | > |

| HISTORY ID | CONFER-ENCE ID | DATE AND TIME | USER NAME | DOCUMENT/ IMAGE FILE PATH | DEVICE INFORMATION | PROCESSING INFORMATION | PROCESSING TIME |
|---|---|---|---|---|---|---|---|
| 00002 | 1111 | 01/31 12:10:00 | bbb | /xxx/doc_p1.png | PROJECTOR 1 | PROJECTION | 2.3 |
| 00003 | 1111 | 01/31 12:10:03 | bbb | /xxx/doc_p2.png | PROJECTOR 1 | PROJECTION | 159.3 |
| 00004 | 1111 | 01/31 12:12:44 | bbb | /xxx/doc_p3.png | PROJECTOR 1 | PROJECTION | 1.5 |
| 00005 | 1111 | 01/31 12:12:46 | bbb | /xxx/doc_p4.png | PROJECTOR 1 | PROJECTION | 30.4 |

[Fig. 37]
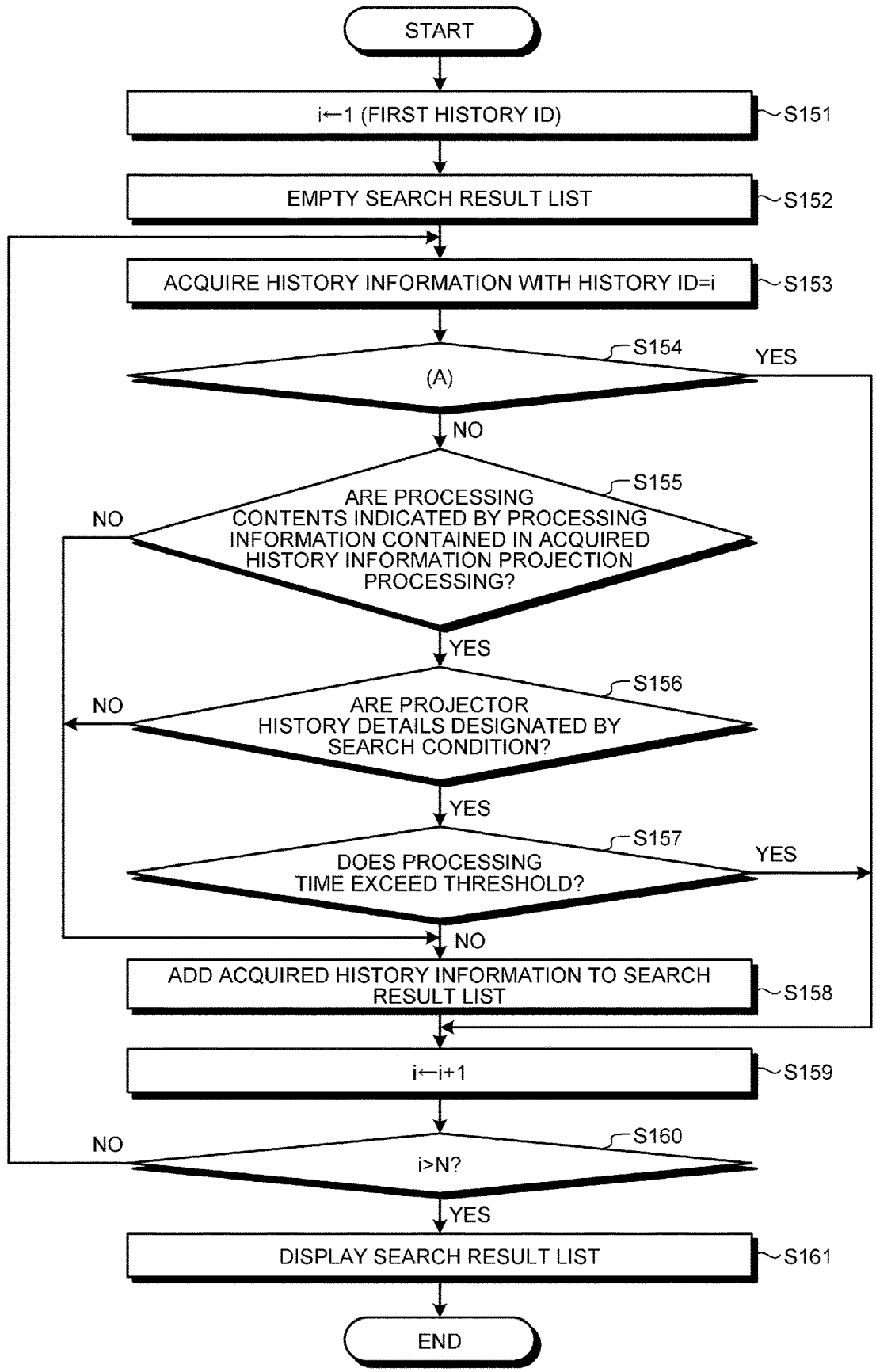

[Fig. 38]
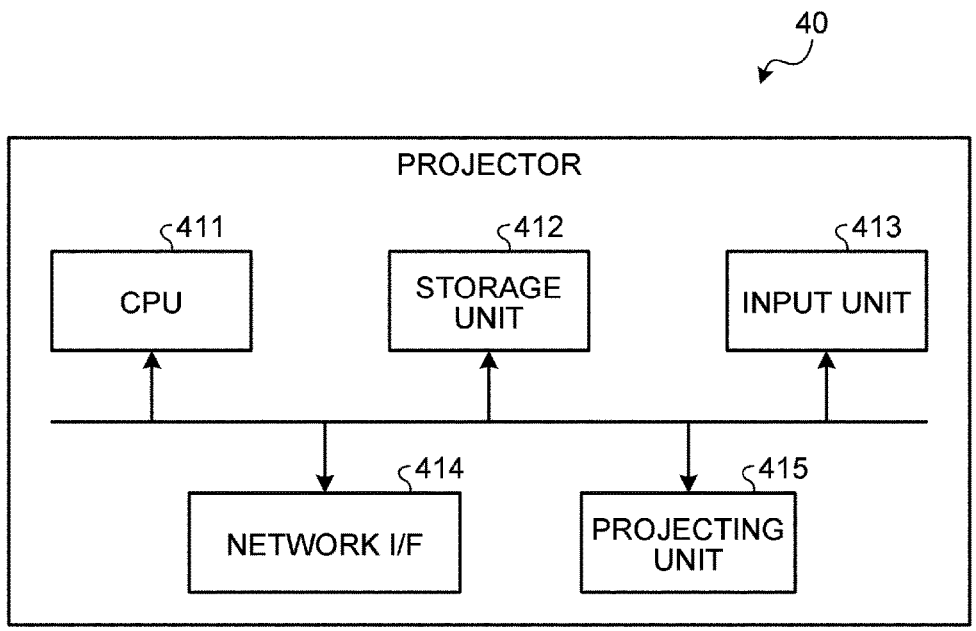
[Fig. 39]
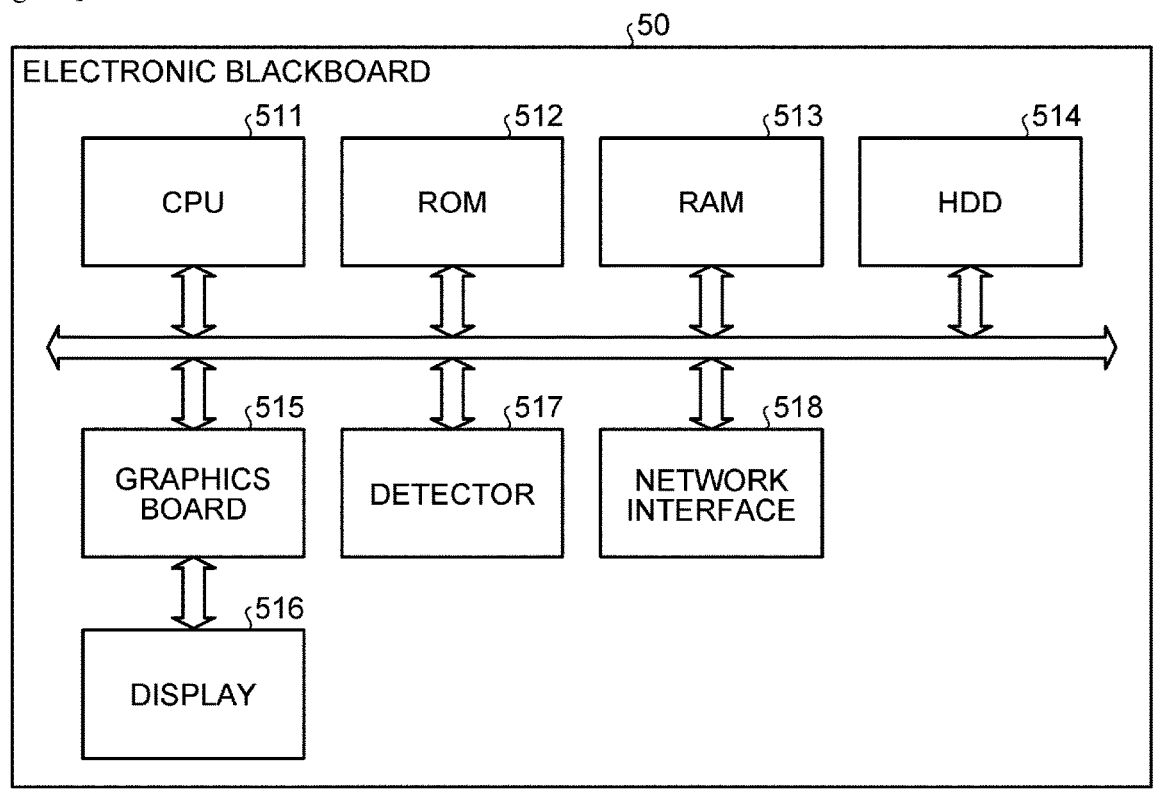

[Fig. 40]
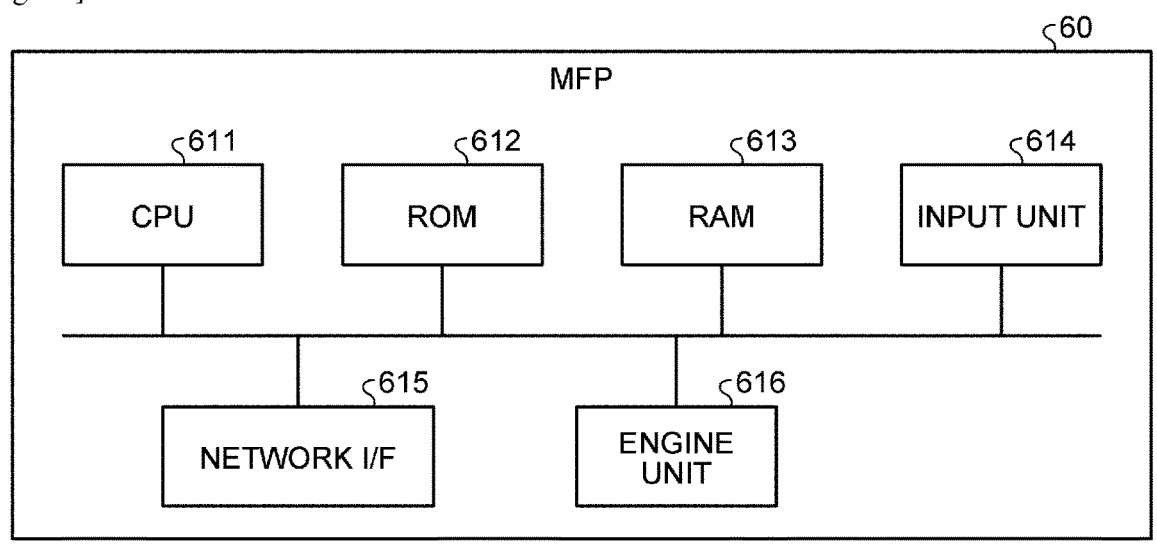

SYSTEM, METHOD FOR PROCESSING INFORMATION, AND INFORMATION PROCESSING APPARATUS

TECHNICAL FIELD

Embodiments relate to a system, a method for processing information, and an information processing apparatus.

BACKGROUND ART

A device cooperation system is conventionally known that in a conference held using various devices connected via a network achieves cooperative processing that performs processing with the device cooperated.

Japanese Unexamined Patent Application Publication No. 2006-92339 discloses a technique that, for the purpose of enabling images and documents handled in a conference to be retrieved later in connection with the conference, associates images and documents handled in a workspace of a conference with a context (the conference), for example.

However, in a conference, requests to see data projected or displayed during the conference again are often made. The technique disclosed in Japanese Unexamined Patent Application Publication No. 2006-92339 requires finding previously handled data from a folder to check the previously handled data and hence has a problem in that operability when an instruction about to which device the previously handled data is output is performed is bad.

SUMMARY OF THE INVENTION

According to exemplary embodiments of the present invention, there is provided a system comprising an information terminal, an information processing apparatus, and one or more devices that execute processing of data received from the information processing apparatus, the system comprising: a storage unit configured to store therein history information that associates the device that executed the processing and the processed data with each other; a screen display unit configured to display a screen in which at least one piece of history information is displayed and be used for causing the device to execute processing based on the history information selected from the displayed at least one piece of history information; a generating unit configured to generate instruction information for instructing the device to execute processing of data corresponding to the history information selected from the at least one piece of history information on the screen displayed by the screen display unit; a processing executing unit configured to execute the processing of the data based on the instruction information generated by the generating unit; and a recording unit configured to record the device that executed the processing and the processed data in the storage unit as the history information based on the instruction information for instructing the processing of the data executed by the processing executing unit.

BRIEF DESCRIPTION OF DRAWINGS

FIG. 1 is a diagram of an example of a configuration of a system.
FIG. 2 is a diagram of an example of a hardware configuration of an information processing server.
FIG. 3 is a diagram of an example of functions that the information processing server has.
FIG. 4 is a diagram of an example of a hardware configuration of an information terminal.
FIG. 5 is a diagram of an example of functions that the information terminal has.
FIG. 6 is a diagram of an example of functions provided by a client application.
FIG. 7 is a diagram of an example of history information.
FIG. 8 is a diagram of an example of an initial operating screen.
FIG. 9 is a diagram of an example of an operating screen.
FIG. 10 is a flowchart of an operation example of the information terminal.
FIG. 11 is a diagram of an example of the operating screen.
FIG. 12 is a diagram of an example of an input/output selection screen.
FIG. 13 is a diagram of an example of the input/output selection screen.
FIG. 14 is a flowchart of an example of search processing.
FIG. 15 is a diagram of an example of a search result list.
FIG. 16 is a diagram of an example of a file selection screen.
FIG. 17 is a diagram of an example of an input device selection screen.
FIG. 18 is a diagram of an example of an output device selection screen.
FIG. 19A is a diagram of an example of an instruction operating screen.
FIG. 19B is a diagram of an example of the instruction operating screen.
FIG. 20 is a diagram of an example of the operating screen.
FIG. 21 is a flowchart of an operation example of the information terminal.
FIG. 22 is a diagram of an example of the operating screen.
FIG. 23 is a diagram of an example of the instruction operating screen.
FIG. 24 is a diagram of an example of the operating screen.
FIG. 25 is a diagram of an example of the operating screen.
FIG. 26 is a sequence diagram of an example of a processing procedure of an inter-device cooperative operation.
FIG. 27 is a diagram of an example of history information corresponding to whiteboard image storage processing.
FIG. 28 is a flowchart of an operation example of an information processing server of a second embodiment of the present invention.
FIG. 29 is a flowchart of an example of search processing of the second embodiment.
FIG. 30 is a diagram of an example of history information of a third embodiment of the present invention.
FIG. 31 is a flowchart of an operation example of an information processing server of the third embodiment.
FIG. 32 is a flowchart of an operation example of an information processing server of a fourth embodiment of the present invention.
FIG. 33 is a diagram of an example of history information corresponding to projection processing of a fifth embodiment of the present invention.

FIG. 36 is a diagram of an example of history information corresponding to projection processing of a modification of the fifth embodiment.

FIG. 37 is a flowchart of an example of search processing of the modification of the fifth embodiment.

FIG. 38 is a diagram of an example of a hardware configuration of a projector.

FIG. 39 is a diagram of an example of a hardware configuration of an electronic blackboard.

FIG. 40 is a diagram of an example of a hardware configuration of an MFP.

DESCRIPTION OF EMBODIMENTS

Figure 34:
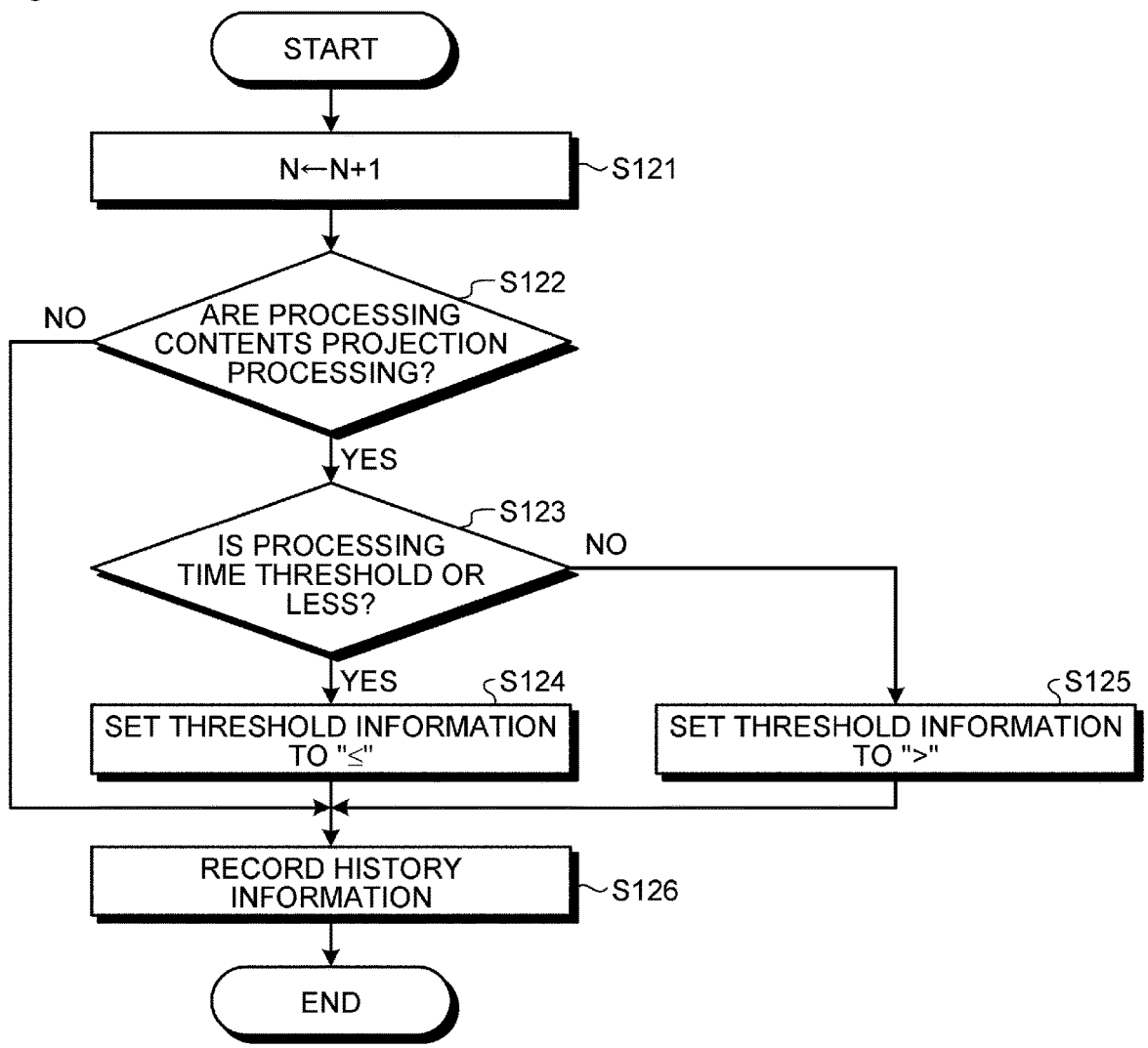
FIG. 34 is a flowchart of an operation example of an information processing server of the fifth embodiment.

The following describes embodiments of a system, a method for processing information, and an information processing apparatus according to the present invention in detail with reference to the accompanying drawings.

First Embodiment

FIG. 1 is diagram of an example of a configuration of a system 100 of the present embodiment. The system 100 of the present embodiment is constructed as a network conference system with a logically closed environment. As illustrated in FIG. 1, the system 100 includes an information processing server 10, a mediator 20, an information terminal 30, a projector 40, an electronic blackboard 50, and an MFP 60. The information processing server 10, the mediator 20, the projector 40, the electronic blackboard 50, and the MFP 60 are connected via a network 70 for conference (hereinafter, simply referred to as a "network 70"). The mediator 20 is an access point, for example, and a range that radio waves emitted by the mediator 20 reach may be referred to as a "border." The mediator 20 is a mediating unit for connecting the information terminal 30 (the information terminal 30 that a conference participant uses) present in the border to the network 70 using a wireless technique such as Bluetooth (registered trademark) and WiFi (registered trademark). Although FIG. 1 exemplifies one information terminal 30 for the convenience of description, this is not limiting, and any number of information terminals 30 are connected to the network 70 via the mediator 20. Although the projector 40, the electronic blackboard 50, and the MFP 60 are exemplified as the devices included in the system 100 in the example in FIG. 1, this is not limiting, and the type and the number of the devices included in the system 100 can freely be changed. To sum up, the system 100 is only required to be a form that includes one or more devices that execute processing of data received from the information processing server 10.

The information processing server 10 is an example of an information processing apparatus and performs management of the entire conference, management (storage, deletion, and the like) of data, output control to devices (the projector 40, the electronic blackboard 50, the MFP 60, and the like), and the like. FIG. 2 is a diagram of an example of a hardware configuration of the information processing server 10. As illustrated in FIG. 2, the information processing server 10 includes a central processing unit (CPU) 101, a random access memory (RAM) 102, a read only memory (ROM) 103, a hard disk drive (HDD) 104, a device I/F 105, and a network I/F 108, which are connected with each other via a bus 109. To the device I/F 105, a display unit 106 and an operating unit 107 are connected.

The CPU 101 is an arithmetic unit and comprehensively controls the operation of the entire information processing server 10. The RAM 102 is a volatile storage medium that enables high-speed reading and writing of information and is used as a work area when the CPU 101 processes information. The ROM 103 is a read-only non-volatile storage medium and stores therein computer programs such as firmware. The HDD 104 is a non-volatile storage medium that enables reading and writing of information and stores therein an operating system (OS), various kinds of control programs, application programs, and the like.

The device I/F 105 is an interface for connecting the display unit 106 and the operating unit 107 to the bus 109. The display unit 106 is a visual user interface for displaying various kinds of information and includes a liquid crystal display (LCD), for example. The operating unit 107 is a user interface for causing a user to input various kinds of information to the information processing server 10 such as a keyboard and a mouse. The network I/F 108 is an interface for connecting the information processing server 10 to the network 70.

FIG. 3 is a diagram of an example of functions that the information processing server 10 has (functions executed by the CPU 101 of the information processing server 10). Although FIG. 3 mainly exemplifies the functions concerning the present embodiment for the convenience of description, the functions that the information processing server 10 has are not limited thereto. As illustrated in FIG. 3, the information processing server 10 includes a device monitoring unit 111, a command analyzing unit 112, a job managing unit 113, a network controller 114, a data managing unit 115, a history managing unit 116, a history information database 117, and a conference information database 119.

The device monitoring unit 111 monitors the other devices connected to the network 70 and the state thereof and manages available functions. The command analyzing unit 112 analyzes a command instruction (described below) received from the information terminal 30, compares the command instruction with the functions managed by the device monitoring unit 111 (the available functions), and notifies the job managing unit 113 of processing contents by the other devices. The command analyzing unit 112 receives information on conferences such as preparation and editing of a starting time, an ending time, and the like of conferences and participation and leaving in and from conferences (conference information) and requests the data managing unit 115 to update the conference information. Furthermore, the command analyzing unit 112 can also request the history managing unit 116 to acquire history information.

The job managing unit 113 generates (constructs) a job for any of the other devices from the contents notified of from the command analyzing unit 112, transmits the generated job, and receives a job response via the network controller 114. Image data acquired by the job response is delivered to the data managing unit 115. The network controller 114 controls information exchange with the outside via the network I/F 108 illustrated in FIG. 2.

The data managing unit 115 stores the conference information received from the command analyzing unit 112 and the image data received from the job managing unit 113 in the conference information database 119. In this example, the conference information database 119 integrally manages data (image data or the like) of materials used in conferences and can include the HDD 104, for example. The data managing unit 115 acquires the conference information and the image data from the conference information database 119 in response to a request from the command analyzing unit 112 or the job managing unit 113 and provides the conference information and the image data. The data managing unit 115 generates the history information and delivers the history information to the history managing unit 116. The data managing unit 115 generates the history information and delivers the history information to the history managing unit 116 every time the conference information or the image data acquired by the job response is stored, for example. Specific contents of the history information will be described below.

The history managing unit 116 stores (records) the history information that the data managing unit 115 has generated in the history information database 117 as an example of a "storage unit." In this example, the history managing unit 116 is an example of a "recording unit." The history information database 117 can include the HDD 104, for example. The history managing unit 116 can acquire the history information from the history information database 117 in response to a request from the command analyzing unit 112 and provide the history information.

Although the above-described functions that the information processing server 10 has (the device monitoring unit 111, the command analyzing unit 112, the job managing unit 113, the network controller 114, the data managing unit 115, and the history managing unit 116,) are implemented by causing the CPU 101 to execute the computer programs stored in the ROM 103 or the like, this is not limiting, and at least part of the functions that the information processing server 10 has may be configured by an exclusive hardware circuit, for example.

FIG. 4 is a diagram of an example of a hardware configuration of the information terminal 30. The information terminal 30 includes a mobile multifunction device (a smart device) such as a smartphone and a tablet. As illustrated in FIG. 4, the information terminal 30 includes a central processing unit (CPU) 201, a random access memory (RAM) 202, a read only memory (ROM) 203, a hard disk drive (HDD) 204, a device I/F 205, and a wireless communication I/F 208, which are connected with each other via a bus 209. To the device I/F 205, a display unit 206 and an operating unit 207 are connected.

The CPU 201 is an arithmetic unit and comprehensively controls the operation of the entire information terminal 30. The RAM 202 is a volatile storage medium that enables high-speed reading and writing of information and is used as a work area when the CPU 201 processes information. The ROM 203 is a read-only non-volatile storage medium and stores therein computer programs such as firmware. The HDD 204 is a non-volatile storage medium that enables reading and writing of information and stores therein an operating system (OS), various kinds of control programs, application programs, and the like.

The device I/F 205 is an interface for connecting the display unit 206 and the operating unit 207 to the bus 209. The display unit 206 is a visual user interface for displaying various kinds of information and includes a liquid crystal display (LCD), for example. The operating unit 207 is a user interface for causing a user to input various kinds of information to the information terminal 30 such as a keyboard and a mouse. The wireless communication I/F 208 is an interface for causing the information terminal 30 to perform wireless communication with the mediator 20.

FIG. 5 is a diagram of an example of functions that the information terminal 30 has (functions executed by the CPU 201 of the information terminal 30). Although FIG. 5 mainly exemplifies the functions concerning the present embodiment for the convenience of description, the functions that the information terminal 30 has are not limited thereto. As illustrated in FIG. 5, the information terminal 30 includes an operation controller 212, a display controller 213, a wireless communication controller 214, and a client application 215. The operation controller 212 acquires an operation signal input via the operating unit 207 and inputs the operation signal to a module operating in the information terminal 30 such as the client application 215. It can also be considered that the operation controller 212 has the function of receiving operations by the user. The display controller 213 is an example of a "screen display unit" and performs control to display various kinds of information on the information terminal 30 such as a graphical user interface (GUI) of the client application 215 on the display unit 206. The wireless communication controller 214 controls communication with another device via the wireless communication I/F 220. The wireless communication controller 214 acquires information input via the wireless communication I/F 220 and transmits information to be transmitted to the other device via the wireless communication I/F 220, for example.

The client application 215 is a software module that provides various kinds of functions in the information terminal 30 and includes software programs corresponding to the respective functions. An exclusive application for utilizing the conference system according to the present embodiment is also contained in the client application 215.

FIG. 6 is a diagram of an example of the functions provided by the client application 215. Although FIG. 6 exemplifies only the function according to the present embodiment for the convenience of description, the functions provided by the client application 215 are not limited thereto. As illustrated in FIG. 6, the client application 215 includes a command instruction generating unit 301 and a command instruction transmitter 302.

The command instruction generating unit 301 generates the command instruction in response to a user's operation received on an operating screen described below. Specific contents of the command instruction will be described below. The command instruction transmitter 302 transmits the command instruction generated by the command instruction generating unit 301 to the information processing server 10 via the mediator 20. The information processing server 10 that has received the command instruction generates a job based on the received command instruction. The information processing server 10 transmits the generated job to a target device and records the history information based on a job response received from the device. Specific contents of the history information will be described.

The history information is information that associates a device that has executed processing and the processed data with each other. More specifically, the history information is information that associates at least processing, data (image data, for example) handled in the processing, and a device (any device included in the system 100) that has executed the processing with each other. The data handled in the processing is data used in the processing or data obtained as a result of the processing. FIG. 7 is an example of the history information. The example in FIG. 7 exemplifies five pieces of history information. In this example, each of the respective pieces of history information is information that associates a history ID identifying the history information, a conference ID identifying a conference, a date and time when the processing was executed, a user name identifying a user (an operator) of the information terminal 30 that issued the command instruction, a document/image file path (a position at which the data is stored in the conference information database 119 in this example) identifying data handled in the processing, device information indicating a device that has executed the processing, and processing information indicating the contents of the processing with each other.

Although the above-described functions that the information terminal 30 has are implemented by causing the CPU 201 to execute the computer programs stored in the ROM 203 or the like, this is not limiting, and at least part of the functions that the information terminal 30 has may be configured by an exclusive hardware circuit, for example.

For the purpose of improving operability when an instruction about to which device previously handled data is output is performed, the system 100 of the present embodiment displays a screen (an operating screen of the information terminal 30) in which at least one piece of history information is displayed and that is used for causing the device to perform processing based on history information selected from the displayed at least one piece of history information and designation of a device to be caused to execute the processing and generates instruction information for instructing the device designated on the screen to execute the processing of data corresponding to the history information selected from the at least one piece of history information on the displayed screen. More specifically, the screen receives selection of any of one or more pieces of history information and receives designation of the processing using data contained in the selected history information and designation of a device to execute the designated processing. The system 100 of the present embodiment has the function of generating the instruction information (the command instruction or the job described below) that instructs the device to execute the designated processing using the data contained in the selected history information based on a user's operation received.

In the present embodiment, the information terminal 30 generates the command instruction that designates processing to be executed and a device that executes the processing in response to a user's operation received on the screen containing at least one piece of history information and designates data contained in the history information selected from the one or more pieces of history information as data to be handled in the processing and transmits the generated command instruction to the information processing server 10. The information processing server 10 that has received the command instruction generates a job to instruct (order) the device designated by the command instruction to execute the processing designated by the command instruction using the data designated by the command instruction. In this example, it can also be considered that a combination of the command analyzing unit 112 and the job managing unit 113 or at least either the command analyzing unit 112 or the job managing unit 113 corresponds to a "generating unit." The information processing server 10 transmits the generated job to the target device (in other words, the information processing server 10 instructs the execution of the generated job). The device executes the processing corresponding to the job received from the information processing server 10 and then transmits a job response to the information processing server 10. In this example, the respective devices (the projector 40, the electronic blackboard 50, and the MFP 60 in this example) included in the system 100 have at least the function of executing the processing of data based on the job received from the information processing server 10 (a processing executing unit) and the function of executing the processing of the data based on the job and then transmitting the job response indicating that the processing of the data based on the job has been executed to the information processing server 10 (a response transmitter). The information processing server 10 has the function of recording the device that has executed the processing and the processed data as the history information based on the instruction information for instructing the processing of the data executed by the processing executing unit (a recording unit). More specifically, when receiving the job response from the device that has executed the job generated by the information processing server 10 (the generating unit), the information processing server 10 records the history information that associates at least the processing corresponding to the job, the data handled in the processing corresponding to the job, and the device that has executed the processing corresponding to the job with each other.

The following describes a method by which the information terminal 30 generates the command instruction. First, with an initial operating screen as illustrated in FIG. 8 displayed on the display unit 206, upon reception of an operation to select an item of "select from devices" (an operation to press an icon of "select from devices"), the display controller 213 displays the operating screen corresponding to "select from devices" as illustrated in FIG. 9 on the display unit 206. The following describes an example of screen transition from the operating screen corresponding to "select from devices" with reference to FIG. 10.

First, as illustrated in FIG. 10, the display controller 213 displays the operating screen corresponding to "select from devices" on the display unit 206 (Step S1). Next, an operation to select a device type is received (Step S2). This example will be described based on the premise that an operation to select "MFP/LP" as the device type (an operation to press an icon of "MFP/LP" illustrated in FIG. 9) has been received. Next, the display controller 213 displays the operating screen corresponding to the device type selected at Step S2 on the display unit 206 (Step S3). In this example, the operating screen corresponding to "MFP/LP" is as illustrated in FIG. 11.

Next, an operation to select a function type is received (Step S4). This example will be described based on the premise that an operation to select "print" as the function type (an operation to press an icon of "print" illustrated in FIG. 11) has been received. Next, the display controller 213 displays an input/output selection screen as illustrated in FIG. 12 on the display unit 206 (Step S5). In this situation, the information terminal 30 (the display controller 213, for example) acquires the history information (the history information with an amount that can be displayed by the information terminal 30) held in the history information database 117 from the information processing server 10 and displays the pieces of history information on the input/output selection screen as illustrated in FIG. 13. Only partial items among the items contained in the history information may be displayed, for example.

The following continuously describes FIG. 10. If search processing is executed (Yes at Step S6), the display controller 213 performs control to display the history information matching a search condition among the pieces of history information displayed on the input/output selection screen by default (the history information acquired from the information processing server 10) on the input/output selection screen (Step S7), and the process advances to Step S8. In other words, the display controller 213 performs the search processing to search for the history information matching the search condition among the pieces of history information displayed on the input/output selection screen by default and performs control to display the history information obtained as a result of the search processing on the screen. If the search processing is not executed (No at Step S6), the process advances to Step S8 without being processed.

The following describes the search processing. In this example, the user can select any one search item by a pull-down menu (a pull-down menu for selecting a search item) 401 illustrated in FIG. 13. Next, the user can select any one candidate by a pull-down menu 402 for selecting a candidate corresponding to the selected search item. With this operation, the history information containing the candidate of the selected search item among the pieces of history information on the input/output selection screen is an object to be searched for. In other words, the search condition indicating that the history information containing the candidate of the selected search item is searched for is set from among the pieces of default history information (the history information acquired from the information processing server 10). When an operation to instruct the execution of the search processing (an operation to press an icon of "search" in this example) has been received, the search processing is executed. When an operation to instruct to restore the default state (an operation to press an icon of "clear") has been received, the selected search item and candidate are cleared (in other words, the set search condition is cleared), and the pieces of default history information are displayed again. With this operation, the user can perform the search processing again with the search condition changed. A plurality of icons (pull-down menus, for example) for selecting the search item may be provided, and an icon for selecting the corresponding candidate may be provided for each of the icons.

FIG. 14 is a flowchart of an example of the search processing. As illustrated in FIG. 14, a number i of a target history ID is set to "1" (Step S31), and a search result list is emptied (Step S32). From the history ID with a number indicating "i" in order, the following processing is executed.

The display controller 213 acquires the history information corresponding to the history ID with the number indicating "i" from among the pieces of history information acquired from the information processing server 10 (the pieces of history information displayed on the input/output selection screen by default) (Step S33). Next, the display controller 213 checks whether the conference ID is designated by the search condition and whether the designated conference ID fails to match the conference ID contained in the history information acquired at Step S33 (Step S34). If the result at Step S34 is affirmative (Yes at Step S34), the process advances to Step S40. If the result at Step S34 is negative (No at Step S34), the process advances to Step S35.

At Step S35, the display controller 213 checks whether the date and time (range) is designated by the search condition and whether the designated date and time range fails to contain the date and time contained in the history information acquired at Step S33 (Step S35). If the result at Step S35 is affirmative (Yes at Step S35), the process advances to Step S40. If the result at Step S35 is negative (No at Step S35), the process advances to Step S36.

At Step S36, the display controller 213 checks whether the user name is designated by the search condition and whether the designated user name fails to match the user name contained in the history information acquired at Step S33 (Step S36). If the result at Step S36 is affirmative (Yes at Step S36), the process advances to Step S40. If the result at Step S36 is negative (No at Step S36), the process advances to Step S37.

At Step S37, the display controller 213 checks whether the device is designated by the search condition and whether the designated device fails to match the device indicated by the device information contained in the history information acquired at Step S33 (Step S37). If the result at Step S37 is affirmative (Yes at Step S37), the process advances to Step S40. If the result at Step S37 is negative (No at Step S37), the process advances to Step S38.

At Step S38, the display controller 213 checks whether the processing contents are designated by the search condition and whether the designated processing contents fail to match the processing contents indicated by the processing information contained in the history information acquired at Step S33 (Step S38). If the result at Step S38 is affirmative (Yes at Step S38), the process advances to Step S40. If the result at Step S38 is negative (No at Step S38), the process advances to Step S39.

At Step S39, the display controller 213 adds the history information acquired at Step S33 to the search result list (Step S39) and increments the number i of the target history ID by "1" (Step S40). Next, it is checked whether the number i exceeds a last number N of the history ID (Step S41). If the result at Step S41 is affirmative (Yes at Step S41), the search result list as illustrated in FIG. 15 (an example when the processing contents indicating "projection" are designated by the search condition) is displayed, for example (Step S42). If the result at Step S41 is negative (No at Step S41), the pieces of processing at Step S33 and the subsequent steps are repeated.

Referring back to FIG. 10, the description continues. If an operation to select an input file has been received at Step S8 (Yes at Step S8), the display controller 213 displays a file selection screen as illustrated in FIG. 16 on the display unit 206 (Step S9). The user can select any of the pieces of history information displayed on the input/output selection screen (the pieces of default history information or the search result list) as the input file and can also select the input file from data that the information processing server 10 holds as conference materials, for example. In this example, when an operation to press an icon of "local file" on the input/output selection screen illustrated in FIG. 13 has been received, the display controller 213 displays a list of the data that the information processing server 10 holds on the input/output selection screen, whereby the user can perform an operation to select any of the displayed data as the input file.

If the operation to select the input file has not been received (No at Step S8), and if an operation to select an input device has been received (Yes at Step S10), in other words, if an operation to select any device from a pull-down menu of "select from devices" of the input/output selection screen illustrated in FIG. 13 as the input device has been received in this example, an input device selection screen as illustrated in FIG. 17 is displayed on the display unit 206 (Step S11). In the example in FIG. 17, it can be considered that Projector 1 is selected as the input device and that requesting data (image data) being used (being projected) by Projector 1 as data for use in processing by an output device is selected.

If the result at Step S10 is negative (No at Step S10), and if an operation to select the output device has been received (Yes at Step S12), the display controller 213 displays an output device selection screen as illustrated in FIG. 18 on the display unit 206 (Step S13). In the example in FIG. 18, it can be considered that MFP 1 is selected as the output device and that requesting print processing of the input file (the input file is in a state of being unselected in the example in FIG. 18) to MFP 1 is selected.

The pieces of processing at Step S8 and the subsequent steps are repeated until input/output settings are completed as described above, and if the input/output settings are completed (Yes at Step S14), the display controller 213 displays an instruction operating screen as illustrated in FIGS. 19A and 19B on the display unit 206 (Step S15). If an operation to instruct the execution of processing (an operation to press an icon of "start printing" in the example in FIGS. 19A and 19B) has been received via the instruction operating screen (Yes at Step S16), a command instruction is generated based on the set input/output, and the generated command instruction is transmitted to the information processing server 10 (Step S17).

Next, if an operation to select an item of "select from files" (an operation to press an icon of "select from files") has been received with the initial operating screen as illustrated in FIG. 8 displayed on the display unit 206, the display controller 213 displays the operating screen corresponding to "select from files" as illustrated in FIG. 20 on the display unit 206. The following describes an example of screen transition from the operating screen corresponding to "select from files" with reference to FIG. 21.

First, the display controller 213 displays the operating screen corresponding to "select from files" on the display unit 206 as illustrated in FIG. 21 (Step S51). In this situation, the information terminal 30 (the display controller 213, for example) acquires the history information (the history information with an amount that can be displayed by the information terminal 30) held in the history information database 117 from the information processing server 10 and displays the pieces of history information on the operating screen corresponding to "select from files" as illustrated in FIG. 22 If the above search processing is executed (Yes at Step S52), the display controller 213 performs control to display the history information matching the search condition among the pieces of history information displayed on the operating screen by default (Step S53), and the process advances to Step S54. If the search processing is not executed (No at Step S52), the process advances to Step S54 without being processed. Specific contents of the search processing are as described above.

If an operation to select the input file has been received at Step S54 (Yes at Step S54), the process advances to Step S55. The following describes a case in which an operation to select any history information has been received as the input file as an example. In this case, so that a job corresponding to the selected history information will be reproduced, the display controller 213 automatically sets the device indicated by the device information contained in the history information and a function corresponding to the processing content indicated by the processing information contained in the history information as output settings and displays the instruction operating screen as illustrated in FIG. 23 on the display unit 206 (Step S55). The example in FIG. 23 assumes a case in which the device information contained in the selected history information indicates "MFP 1" and the processing information contained in the history information indicates "print."

If an operation to change the output settings has been received (Yes at Step S56), the output settings are changed in accordance with the received operation (Step S57). If an operation to change the output settings is not received for a certain period (No at Step S56), and if an operation to instruct the execution of the processing (an operation to press an icon of "start printing" in the example in FIG. 23) has been received (Yes at Step S58), a command instruction is generated based on the set input/output, and the generated command instruction is transmitted to the information processing server 10 (Step S59).

In this example, it can be considered that an operation to select any history information and to instruct the execution of the processing without changing the output settings corresponds to an operation to instruct the reproduction of the selected history information. Without limited to the above, a form is possible in which even when any history information is selected, the output settings are not automatically performed, and after any history information is selected, the output settings are performed in accordance with a user's operation, for example. In this form, when receiving an operation to select an output function type via the operating screen in which any history information has been selected as the input file as illustrated in FIG. 24, the display controller 213 can display devices that can provide the selected function (it is assumed that "print" has been selected in this example) as candidates of the output device as illustrated in FIG. 25 and set the output device in accordance with a selection operation by the user, for example. In this form, an icon of "replay" is displayed on the operating screen in a state before selecting the output function type (the operating screen illustrated in FIG. 24 in this example), and when the pressing of this icon has been received, the device indicated by the device information contained in the selected history information and the function corresponding to the processing content indicated by the processing information contained in the history information can automatically be set to display the instruction operating screen on the display unit 206. In this example, it can be considered that the operation to press the icon of "replay" corresponds to the operation to instruct the reproduction of the selected history information.

FIG. 26 is a sequence diagram of an example of a processing procedure of an interdevice cooperative operation. The following describes a case in which the information terminal 30 has generated a command instruction indicating that an image read by a scan function of the MFP 60 is projected by the projector 40 in the above procedure as an example. In this example, the input device is the MFP 60, whereas the output device is the projector 40.

First, as illustrated in FIG. 26, the information terminal 30 transmits the generated command instruction to the information processing server 10 (Step S71). The information processing server 10 that has received the command instruction analyzes the received command instruction and generates (constructs) a job required for the cooperative processing. In this example, the information processing server 10 first generates a scan job that instructs the MFP 60 to execute scan processing that reads an image from a document and transmits the generated scan job to the MFP 60 (Step S72). The MFP 60 that has received the scan job returns a job response to the information processing server 10 (Step S73) and executes the scan processing (Step S74). The information processing server 10 then periodically transmits a state information acquisition job that requests the acquisition of state information indicating the state of a device to the MFP 60 (Step S75). The MFP 60 that has received the state information acquisition job returns the state information indicating the current state of the MFP 60 to the information processing server 10 as a job response (Step S76). When acquiring the state information indicating that the scan processing is completed as the job response, the information processing server 10 transmits an image data acquisition job that requests the acquisition of image data obtained by the scan processing to the MFP 60 (Step S77). The MFP 60 that has received the image data acquisition job returns the image data obtained by the scan processing to the information processing server 10 as a job response (Step S78). The information processing server 10 records the image data acquired as the job response in the conference information database 119, generates the above history information, and records the history information in the history information database 117 (Step S79). The history information in this case contains the date and time when the image data obtained by the scan processing was acquired, the user name indicating the user of the information terminal 30 that issued the command instruction, information that can identify a stored position of the image data (a file path, for example) in the conference information database 119, the device information indicating the MFP 60, and the processing information indicating the scan processing in addition to the history ID and the conference ID.

Next, the information processing server 10 generates a projection job that instructs the projector 40 to execute projection processing that projects the image data obtained by the scan processing and transmits the generated projection job to the projector 40 (Step S80). The projection job contains the image data obtained by the scan processing in addition to instruction information. The projector 40 that has received the projection job returns a job response to the information processing server 10 (Step S81) and executes the projection processing in accordance with the projection job (Step S82). The information processing server 10 that has received the job response generates the above history information and records the history information in the history information database 117 (Step S83). The history information in this case contains the date and time when the job response to the projection job was received, the user name indicating the user of the information terminal 30 that issued the command instruction, information that can identify a stored position of the image data (the image data obtained by the scan processing in this example) used in the projection processing in the conference information database 119, the device information indicating the projector 40, and the processing information indicating the projection processing in addition to the history ID and the conference ID.

As described above, the present embodiment displays the screen (the operating screen of the information terminal 30) in which at least one piece of history information is displayed and that is used for causing the device to perform the processing based on the history information selected from the displayed at least one piece of history information and the designation of the device that is caused to execute the processing and generates the instruction information (e.g., job) for instructing the device to execute the processing of the data corresponding to the history information selected from at least one piece of history information on the displayed screen. The present embodiment can easily identify data that requires certain processing or reprocessing from the displayed history information and can thereby improve operability when an instruction about to which device the identified data is output is performed. The present embodiment can immediately instruct reprojection, redisplay, or the like from the history information to a request, in a conference, to see data projected or displayed during the conference again.

Although in the above embodiment, the information processing server 10 generates the job based on the command instruction received from the information terminal 30, this is not limiting, and a form is possible in which the information terminal 30 generates a job that instructs the execution of the processing using the data contained in the selected history information based on a user's operation received on the screen containing at least one or more pieces of history information, for example. In short, the system 100 of the present embodiment is only required to be a form having the functions of displaying the screen (the operating screen of the information terminal 30) in which at least one piece of history information is displayed and that is used for causing the device to perform the processing based on the history information selected from the displayed at least one piece of history information and the designation of the device that is caused to execute the processing and generating the instruction information (e.g., job) for instructing the device to execute the processing of the data corresponding to the history information selected from at least one piece of history information on the displayed screen.

Second Embodiment

The following describes a second embodiment. For parts common to the first embodiment, descriptions thereof will be omitted as appropriate. In the present embodiment, the history information corresponding to first processing, which is any of a plurality of pieces of processing, is information that associates the first processing, the device that executed the first processing, data processed in the first processing, and final result information indicating whether a result of the first processing is a final result with each other. The first processing in the present embodiment is processing to store an image displayed on the electronic blackboard 50 and, when the fact that an image drawn on the electronic blackboard 50 has been stored is left as a history, records whether the drawn image is a final result in combination.

In the present embodiment, the information terminal 30 designates whiteboard image storage processing to store an image being displayed on the electronic blackboard 50 as processing to be executed in response to an operation by a user (a conference participant), generates a command instruction that designates the electronic blackboard 50 connected to the network 70 as a device that executes the processing, and transmits the command instruction to the information processing server 10. The information processing server 10 generates a whiteboard image storage job that instructs the designated electronic blackboard 50 to execute the whiteboard image storage processing based on the received command instruction and transmits the generated whiteboard image storage job to the electronic blackboard 50. The electronic blackboard 50 that has received this whiteboard image storage job returns image data currently being displayed to the information processing server 10 as a job response. In this process, when not receiving any input by a stylus pen or the like for a certain period of time, the electronic blackboard 50 can determine that the image currently being displayed is a final result and can transmit the final result information indicating whether the image currently being displayed is the final result in such a manner as being incorporated into the job response. The job response may contain information indicating processing contents that the device executed (information indicating the "whiteboard image storage processing" in this example). The information processing server 10 records the image data acquired as the job response in the conference information database 119, generates the history information, and records the history information in the history information database 117. The history information in this case contains a date and time when the image data was acquired from the electronic blackboard 50, a user name indicating the user (the operator) of the information terminal 30 that issued the command instruction, information that can identify the stored position of the image data in the conference information database 119

(a document/image file path), the device information indicating the electronic blackboard 50, the processing information indicating the whiteboard image storage processing, and the final result information indicating whether the result of the whiteboard image storage processing is the final result in addition to the history ID and the conference ID.

FIG. 27 is a diagram of an example of the history information corresponding to the whiteboard image storage processing. In FIG. 27, the final result information indicating "NF" means that the result of the whiteboard image storage processing is not the final result, whereas the final result information indicating "F" means that the result of the whiteboard image storage processing is the final result.

FIG. 28 is a flowchart of an operation example of the information processing server 10 when the job response to the whiteboard image storage job has been received. First, the last number N of the history ID is incremented by "1" (Step S91), and the incremented number is assigned as a new history ID. Next, it is checked whether the processing contents are the whiteboard image storage processing (Step S92). If the result at Step S92 is affirmative (Yes at Step S92), it is checked whether the image data received from the electronic blackboard 50 as the job response is the final result (Step S93). If the result at Step S93 is affirmative (Yes at Step S93), with the final result information set to "F" (Step S94), the history information is recorded (Step S96). In contrast, if the result at Step S93 is negative (No at Step S93), with the final result information set to "NF" (Step S95), the history information is recorded (Step S96). If the result at Step S92 is negative (No at Step S92), the corresponding history information is recorded (Step S96).

In the present embodiment, if that the history information containing the whiteboard image storage processing is determined to be an object to be searched for and that the detailed history of the whiteboard image storage processing is determined to be an object to be searched for are designated as the search condition (hereinafter, it may be referred to as "whiteboard history details are designated"), the display controller 213 performs control to display all pieces of history information containing the whiteboard image storage processing on the screen. In contrast, if that the history information containing the whiteboard image storage processing is determined to be an object to be searched for and that the detailed history of the whiteboard image storage processing is determined to be an object to be searched for are not designated as the search condition, the display controller 213 performs control to display the history information containing the whiteboard image storage processing and containing the final result information indicating that the result of the whiteboard image storage processing is the final result on the screen.

FIG. 29 is a flowchart of an example of search processing in the present embodiment. For parts common to FIG. 14, descriptions thereof will be omitted as appropriate. Processing contents at Step S101 to Step S103 in FIG. 29 are similar to the processing contents at Step S31 to Step S33 illustrated in FIG. 14, and detailed descriptions thereof will be omitted. At Step S104 in FIG. 29, whether any of Step S34 to Step S38 in FIG. 14 is affirmative is determined: if the result at Step S104 is affirmative (Yes at Step S104), the process advances to Step S109; and if the result at Step S104 is negative (No at Step S104), the process advances to Step S105.

At Step S105, the display controller 213 checks whether the processing contents indicated by the processing information contained in the history information acquired at Step S103 are the "whiteboard image storage processing" (Step S105). If the result at Step S105 is negative (No at Step S105), the process advances to Step S108, in which the display controller 213 adds the history information acquired at Step S103 to the search result list (Step S108). If the result at Step S105 is affirmative (Yes at Step S105), the process advances to Step S106.

At Step S106, the display controller 213 checks whether the final result information contained in the history information acquired at Step S103 indicates "NF" (Step S106). If the result at Step S106 is negative (No at Step S106), that is, if the final result information contained in the history information acquired at Step S103 indicates "F", the display controller 213 adds the history information acquired at Step S103 to the search result list (Step S108). If the result at Step S106 is affirmative (Yes at Step S106), it is checked whether the whiteboard history details are designated as the search condition (Step S107). If the result at Step S107 is negative (No at Step S107), the process advances to S109. If the result at Step S107 is affirmative (Yes at Step S107), the display controller 213 adds the history information acquired at Step S103 to the search result list (Step S108).

Following Step S108, the display controller 213 increments the number i of the target history ID by "1" (Step S109). Next, it is checked whether the number i exceeds the last number N of the history ID (Step S110). If the result at Step S110 is affirmative (Yes at Step S110), the search result list is displayed (Step S111). If the result at Step S110 is negative (No at Step S110), the pieces of processing at Step S103 and the subsequent steps are repeated.

The present embodiment can determine whether the image of each piece of history information is an image being written or a complete image (the image of the final result). When the history information containing the whiteboard image storage processing is searched for, whether the image being written is included can be designated, whereby only the history information containing the complete image can be retrieved, or the history information containing the image being written can also be retrieved.

Third Embodiment

The following describes a third embodiment. For parts common to the above embodiments, descriptions thereof will be omitted as appropriate. In the present embodiment, when data processed in second processing, which is any of the pieces of processing, is page data contained in a file indicating a set of a plurality of pieces of page data, the history information corresponding to the second processing is information that associates a device that executed the second processing, page data processed in the second processing, and a file containing the page data with each other. The following describes a case in which the second processing is projection processing to project image data as an object to be projected onto a projected object as an example.

In the present embodiment, when the projector 40 connected to the network 70 projects a file (a document file such as conference materials) that the information processing server 10 manages (holds), the information terminal 30 generates a command instruction that designates projection processing as processing to be executed, designates the document file that the information processing server 10 holds as data to be handled in the projection processing, and designates the projector 40 connected to the network 70 as a device that executes the projection processing in response to an operation by a user (a conference participant) and transmits the command instruction to the information processing server 10. The information processing server 10 generates a projection job that instructs the designated projector 40 to execute the projection processing to project the designated document file based on the received command instruction and transmits the generated projection job to the projector 40. The projector 40 that has received this projection job starts the projection of the designated document file and returns a job response indicating that the projection of the document file has been started to the information processing server 10. The information processing server 10 that has received this job response generates history information such as the history ID=00002 in FIG. 30 and records the history information in the history information database 117. In this example, an extension "ppt" of the document/image file path indicates being a document file, whereas an extension "png" indicates being page data.

The screen of the information terminal 30 that issued the command instruction displays the page data on the topmost layer of the document file in a preview manner and, upon reception of a page switching operation (a page forward operation or a page back operation) by the user on the screen, generates a command instruction following the page switching operation and transmits the command instruction to the information processing server 10. The information processing server 10 generates a projection job that instructs the designated projector 40 to execute the projection processing to project the designated page data based on the received command instruction and transmits the generated projection job to the projector 40. The projector 40 that has received this projection job starts the projection of the designated page data and returns a job response indicating that the projection of the designated page data has been started to the information processing server 10. The information processing server 10 that has received this job response generates history information that records related document information identifying a file (an original document file) containing pieces of page data handled in the projection processing such as the history IDs=00003 to 00006 in FIG. 30 and records the history information in the history information database 117. The screen of the information terminal 30 that issued the command instruction displays page data after the switching operation in a preview manner and can receive a page switching operation in a way similar to that described above.

FIG. 31 is a flowchart of an operation example of the information processing server 10 when the job response to the projection job has been received. First, the last number N of the history ID is incremented by "1" (Step S101), and the incremented number is assigned as a new history ID. Next, it is checked whether the processing contents are the projection processing (Step S102). If the result at Step S102 is affirmative (Yes at Step S102), it is checked whether the fact that the projection of the designated page data has been received as the job response (Step S103). If the result at Step S103 is affirmative (Yes at Step S103), with the related document information identifying the file containing the page data recorded (Step S104), the history information is recorded (Step S105). If the result at Step S103 is negative (No at Step S103), the history information is recorded without the related document information recorded (Step S105). If the result at Step S102 is negative (No at Step S102), the corresponding history information is recorded (Step S105).

According to the present embodiment, when the history information recording the related document information has been presented as the search result, for example, the related document information is referred to, thereby enabling the original document to be identified.

Fourth Embodiment

The following describes a fourth embodiment. For parts common to the above embodiments, descriptions thereof will be omitted as appropriate. In the present embodiment, the history information corresponding to specific processing having a processing time of a certain value or less is not recorded. The following describes a case in which the specific processing is the projection processing and in which the job response to the projection job contains a projection time (an example of the processing time) as an example.

FIG. 32 is a flowchart of an operation example of the information processing server 10 when the job response has been received. First, it is checked whether the processing contents are the projection processing (Step S111). If the result at Step S111 is negative (No at Step S111), the process advances to Step S113. If the result at Step S111 is affirmative (Yes at Step S111), it is checked whether the projection time is a certain value or less (Step S112). If the result at Step S112 is affirmative (Yes at Step S112), the process ends without the history information recorded. If the result at Step S112 is negative (No at Step S112), the last number N of the history ID is incremented by "1" (Step S113), and the incremented number is assigned as a new history ID. The history information is then recorded (Step S114).

When the pages of a document are projected, projection is performed while the pages are turned one by one, whereby before a target page is projected, the other pages may be projected only momentarily. The present embodiment does not record the history information corresponding to the projection processing having the projection time of the certain value or less, whereby an image projected only momentarily is not recorded as the history information, and the history information containing an image not intended to be projected is not required to be recorded.

Fifth Embodiment

The following describes a fifth embodiment. For parts common to the above embodiments, descriptions thereof will be omitted as appropriate. In the present embodiment, the history information corresponding to specific processing is information that associates the specific processing, the device that executed the specific processing, data processed in the specific processing, and threshold information indicating whether a processing time is a threshold or less with each other. The following describes a case in which the specific processing is the projection processing and in which the job response to the projection job contains a projection time (an example of the processing time) as an example.

FIG. 33 is a diagram of an example of the history information corresponding to the projection processing. In FIG. 33, the threshold information indicating ">" means that the processing time is not the threshold or less. The threshold indicating "≤" means that the processing time is the threshold or less.

FIG. 34 is a flowchart of an operation example of the information processing server 10 when the job response has been received. First, the last number N of the history ID is incremented by "1" (Step S121), and the incremented number is assigned as a new history ID. Next, it is checked whether the processing contents are the projection processing (Step S122). If the result at Step S122 is affirmative (Yes at Step S122), it is checked whether the projection time notified of as the job response is the threshold or less (Step S123). If the result at Step S123 is affirmative (Yes at Step S123), with the threshold information set to "≤" (Step S124), the history information is recorded (Step S126). In contrast, if the result at Step S123 is negative (No at Step S123), with the threshold information set to ">" (Step S125), the history information is recorded (Step S126). If the result at Step S122 is negative (No at Step S122), the corresponding history information is recorded (Step S126).

In the present embodiment, if that the history information containing the projection processing (an example of the specific processing) is determined to be an object to be searched for and that the detailed history of the projection processing is determined to be an object to be searched for are designated as the search condition (hereinafter, it may be referred to as "projector history details are designated"), the display controller 213 performs control to display all pieces of history information containing the projection processing on the screen. In contrast, if that the history information containing the projection processing is determined to be an object to be searched for and that the detailed history of the projection processing is determined to be an object to be searched for are not designated as the search condition, the display controller 213 performs control to display the history information containing the projection processing and containing the threshold information indicating that the processing time is not the threshold or less on the screen.

Figure 35:
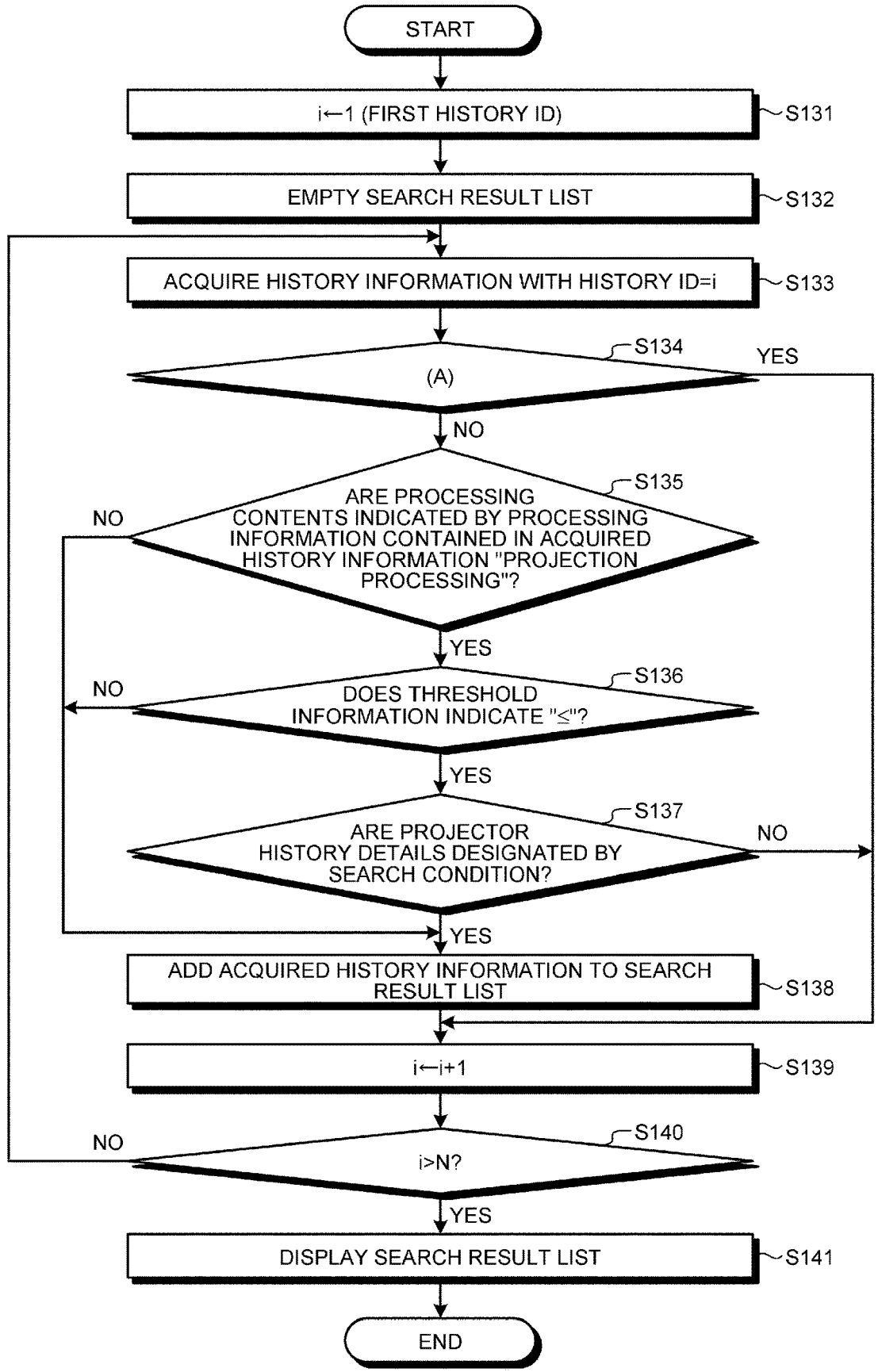
FIG. 35 is a flowchart of an example of search processing of the fifth embodiment.

FIG. 35 is a flowchart of an example of search processing in the present embodiment. For parts common to FIG. 29, descriptions thereof will be omitted as appropriate. Processing contents at Step S131 to Step S134 in FIG. 35 are similar to the processing contents at Step S101 to Step S104 in FIG. 29.

If the result at Step S134 is affirmative (Yes at Step S134), the process advances to Step S139. If the result at Step S134 is negative (No at Step S134), it is checked whether the processing contents indicated by the processing information contained in the history information acquired at Step S133 are the "projection processing" (Step S135). If the result at Step S135 is negative (No at Step S135), the process advances to Step S138, in which the display controller 213 adds the history information acquired at Step S133 to the search result list (Step S138). If the result at Step S135 is affirmative (Yes at Step S135), the process advances to Step S136.

At Step S136, the display controller 213 checks whether the threshold information contained in the history information acquired at Step S133 indicates "≤" (Step S136). If the result at Step S136 is negative (No at Step S136), that is, if the threshold information contained in the history information acquired at Step S133 indicates ">", the display controller 213 adds the history information acquired at Step S133 to the search result list (Step S138). If the result at Step S136 is affirmative (Yes at Step S136), it is checked whether the projector history details are designated as the search condition (Step S137). If the result at Step S137 is negative (No at Step S137), the process advances to Step S139. If the result at Step S137 is affirmative (Yes at Step S137), the display controller 213 adds the history information acquired at Step S133 to the search result list (Step S138).

Following Step S138, the display controller 213 increments the number i of the target history ID by "1" (Step S139). Next, it is checked whether the number i exceeds the last number N of the history ID (Step S140). If the result at Step S140 is affirmative (Yes at Step S140), the search result list is displayed (Step S141), and if the result at Step S140 is negative (No at Step S140), the pieces of processing at Step S133 and the subsequent steps are repeated.

When the pages of a document are projected, projection is performed while the pages are turned one by one, whereby before a target page is projected, a page before the target page may be projected only momentarily. In the present embodiment, a search is performed with the history information containing the threshold information indicating that the processing time is the threshold or less excluded, whereby the history information containing an image not intended to be projected is not required to be displayed. A search is performed with the history information containing the threshold information indicating that the processing time is the threshold or less included if needed, whereby the history information containing the image projected only momentarily can also be displayed.

Modification of Fifth Embodiment

The history information corresponding to specific processing may be information that associates the specific processing, the device that executed the specific processing, data processed in the specific processing, and a processing time with each other, for example. The following describes a case in which the specific processing is the projection processing and in which the job response to the projection job contains a projection time (an example of the processing time) as an example. FIG. 36 is a diagram of an example of the history information corresponding to the projection processing. The example in FIG. 36 contains the processing time in place of the threshold. When recording the history information corresponding to the projection processing, the information processing server 10 records the processing time notified of by the job response in combination.

In this example, if that the history information containing the projection processing is determined to be an object to be searched for and that the detailed history of the projection processing is determined to be an object to be searched for are designated as the search condition, the display controller 213 performs control to display all pieces of history information containing the projection processing on the screen. In contrast, if that the history information containing the projection processing is determined to be an object to be searched for and that the detailed history of the projection processing is determined to be an object to be searched for are not designated as the search condition, the display controller 213 performs control to display the history information containing the projection processing and containing the processing time exceeding the threshold on the screen.

FIG. 37 is a flowchart of an example of search processing in the present modification. For parts common to FIG. 29, descriptions thereof will be omitted as appropriate. Processing contents at Step S151 to Step S154 in FIG. 37 are similar to the processing contents at Step S101 to Step S104 in FIG. 29.

If the result at Step S154 is affirmative (Yes at Step S154), the process advances to Step S159. If the result at Step S154 is negative (No at Step S154), it is checked whether the processing contents indicated by the processing information contained in the history information acquired at Step S153 are the "projection processing" (Step S155). If the result at Step S155 is negative (No at Step S155), the process advances to Step S158, in which the display controller 213 adds the history information acquired at Step S153 to the search result list (Step S158). If the result at Step S155 is affirmative (Yes at Step S155), the process advances to Step S156.

At Step S156, the display controller 213 checks whether the projector history details are designated by the search condition (Step S156). If the result at Step S156 is negative (No at Step S156), the display controller 213 adds the history information acquired at Step S153 to the search result list (Step S158). If the result at Step S156 is affirmative (Yes at Step S156), it is checked whether the processing time contained in the history information acquired at Step S153 exceeds the threshold (Step S157). If the result at Step S157 is affirmative (Yes at Step S157), the process advances to Step S159. If the result at Step S157 is negative (No at Step S157), the display controller 213 adds the history information acquired at Step S153 to the search result list (Step S158).

Following Step S158, the display controller 213 increments the number i of the target history ID by "1" (Step S159). Next, it is checked whether the number i exceeds the last number N of the history ID (Step S160). If the result at Step S160 is affirmative (Yes at Step S160), the search result list is displayed (Step S161), and if the result at Step S160 is negative (No at Step S160), the pieces of processing at Step S153 and the subsequent steps are repeated.

Although the embodiments according to the present invention have been described, the present invention is not limited to the embodiments as they are and can be embodied with the components modified without departing from the essence thereof in an implementing stage. An appropriate combination of a plurality of components disclosed in the embodiments can form various kinds of inventions. Some components may be deleted from all the components disclosed in the embodiments, for example. Furthermore, components across different embodiments and modifications may appropriately be combined.

The speed of turning pages differs depending on individuals, whereby in determining a page not intended to be projected (a page projected only momentarily), the duration of "moment" differs depending on the individual. Given this situation, the duration of the "moment" is designated (the threshold is variably set) in a search, whereby the history information containing the page not intended to be projected is enabled not to be displayed while reflecting differences among individuals.

Computer programs executed by the system 100 of the embodiments may be recorded and provided in a computer-readable recording medium such as a compact disc read only memory (CD-ROM), a flexible disk (FD), a compact disc recordable (CD-R), a digital versatile disc (DVD), and universal serial bus (USB) as an installable or executable file or provided or distributed via a network such as the Internet. Various kinds of computer programs may be embedded in advance and provided in a ROM, for example.

FIG. 38 is a schematic diagram of an example of a hardware configuration of the projector 40. As illustrated in FIG. 38, the projector 40 includes a CPU 411, a storage unit 412, an input unit 413, a network I/F 414, and a projecting unit 415, which are connected with each other via a bus.

The CPU 411 executes a computer program stored in the storage unit 412 and comprehensively controls the operation of the projector 40. The storage unit 412 includes a ROM and an HDD that store therein the computer program that the CPU 411 executes and data required for the execution of the computer program, and a RAM that functions as a work area of the CPU 411. The input unit 413 performs various kinds of input to the projector 40 and is a touch panel, a key switch, or the like. The network I/F 414 is an interface for connecting the projector 40 to the network. The projecting unit 415 projects image data as an object to be projected onto a projected object such as a screen. The projecting unit 415 includes an optical system for projection such as projection lenses, for example.

FIG. 39 is a schematic diagram of an example of a hardware configuration of the electronic blackboard 50. As illustrated in FIG. 39, the electronic blackboard 50 includes a CPU 511, a ROM 512, a RAM 513, a hard disk drive (HDD) 514, a graphics board 515, a display 516, a detector 517, and a network I/F 518, which are connected with each other via a bus.

The CPU 511 reads a computer program stored in the ROM 512, the HDD 514, or the like onto the RAM 513 to execute it and comprehensively controls the operation of the electronic blackboard 50. The graphics board 515 is an apparatus that processes drawing data to be drawn on the display 516 and includes a video RAM (VRAM) that holds images and connecting terminals of the display 516. The display 516 is a display apparatus that displays the drawing data generated by the graphics board 515.

The detector 517 is a detector that detects the fact that an object has been in contact therewith or close thereto. A touch panel including a capacitance sensor that detects capacitance that changes caused by contact with an object (a finger, an exclusive stylus pen, or the like) corresponds to the detector 517, for example. When contact position coordinates or close position coordinates are detected by the detector 517, the graphics board 515 draws a drawn image (a hand-drawn image) based on the detected contact position coordinates or close position coordinates and draws the drawn image on a background image in a superimposed manner. The network I/F 518 is an interface for connecting the electronic blackboard 50 to the network 70.

FIG. 40 is a schematic diagram of an example of the MFP 60. As illustrated in FIG. 40, the MFP 60 includes a CPU 611, a ROM 612, a RAM 613, an input unit 614, a network I/F 615, and an engine unit 616, which are connected with each other via a bus.

The CPU 611 reads a computer program stored in the ROM 612 or the like onto the RAM 613 to execute it and comprehensively controls the operation of the MFP 60. The input unit 614 performs various kinds of input to the MFP 60 and is a touch panel, a key switch, or the like. The network I/F 615 is an interface for connecting the MFP 60 to the network.

The engine unit 616 is hardware that performs versatile information processing and processing other than communication for implementing a copy function, a scanner function, a fax function, and a printer function. The engine unit 616 includes a scanner (an image reading unit) that scans and reads an image of a document, a plotter (an image forming unit) that performs printing on a sheet material such as paper, and a fax unit that performs fax communication, for example.

The invention claimed is:

1. A system comprising an information terminal, an information processing apparatus, and a plurality of devices that execute processing of data received from the information processing apparatus, the system comprising:
   a memory configured to store therein history information that associates the device that executed the processing, the processed data, and identification of a conference session for which the processed data was created with each other, wherein the history information includes a specific image data file name or document file name that represents a piece of information that was outputted or processed during a conference session at a previous time; and
   processing circuitry configured to
      display a screen in which at least one piece of history information is displayed and be used for causing the device to execute processing based on the history information selected from the displayed at least one piece of history information and generate instruction information for instructing the device to execute processing of data corresponding to the history information selected from the at least one piece of history information on the displayed screen;

execute the processing of the data based on the generated instruction information; and record the device that executed the processing and the processed data in the memory as the history information based on the instruction information for instructing the processing of the executed data.

2. The system according to claim 1, wherein
the screen receives selection of any of the at least one piece of history information and receives designation of processing using data contained in the selected history information and designation of the device that executes the designated processing using the data contained in the selected history information.

3. The system according to claim 2, wherein
the processing circuitry generates the instruction information that instructs the designated device to execute the designated processing using the data contained in the selected history information.

4. The system according to claim 1, wherein
the processing circuitry performs control to display the history information matching a search condition among the history information stored in the memory on the screen.

5. The system according to claim 4, wherein
the history information corresponding to first processing is information that associates the first processing, the device that executed the first processing, data processed in the first processing, and final result information indicating whether a result of the first processing is a final result with each other.

6. The system according to claim 5, wherein
when that the history information containing the first processing is determined to be an object to be searched for and that detailed history of the first processing is determined to be an object to be searched for are designated as the search condition, the processing circuitry performs control to display all pieces of history information containing the first processing on the screen, and when that the history information containing the first processing is determined to be an object to be searched for and that the detailed history of the first processing is determined to be an object to be searched for are not designated as the search condition, the processing circuitry performs control to display the history information containing the first processing and containing the final result information indicating that the result of the first processing is the final result on the screen.

7. The system according to claim 5, wherein
the first processing is processing to store an image displayed on an electronic blackboard.

8. The system according to claim 1, wherein
when data processed in second processing is page data contained in a file indicating a set of a plurality of pieces of page data, the history information corresponding to the second processing is information that associates a device that executed the second processing, page data processed in the second processing, and a file containing the page data with each other.

9. The system according to claim 8, wherein
the second processing is projection processing to project image data as an object to be projected onto a projected object.

10. The system according to claim 1, wherein
the history information corresponding to specific processing having a processing time of a certain value or less is not recorded.

11. The system according to claim 4, wherein
the history information corresponding to specific processing is information that associates the specific processing, the device that executed the specific processing, data processed in the specific processing, and threshold information indicating whether a processing time is a threshold or less with each other.

12. The system according to claim 11, wherein
when that the history information containing the specific processing is determined to be an object to be searched for and that detailed history of the specific processing is determined to be an object to be searched for are designated as the search condition, the processing circuitry performs control to display all pieces of history information containing the specific processing on the screen, and when that the history information containing the specific processing is determined to be an object to be searched for and that the detailed history of the specific processing is determined to be an object to be searched for are not designated as the search condition, the processing circuitry performs control to display the history information containing the specific processing and containing the threshold information indicating that the processing time is not the threshold or less on the screen.

13. The system according to claim 4, wherein
the history information corresponding to specific processing is information that associates the specific processing, the device that executed the specific processing, data processed in the specific processing, and a processing time with each other.

14. The system according to claim 1, wherein the plurality of devices includes at least a device configured to display image data and a multi-functional peripheral (MFP), and the history information includes separate processed data performed by each of the device configured to display image data and the MFP during one or more previous conference sessions, where both the processed data performed by the device configured to display image data and the MFP are available to be selected as an input file to be output to another one of the plurality of devices as part of the executing the processing of the data based on the generated instruction information.

15. The system according to claim 14, wherein the device configured to display image data is one of a projector and an electronic blackboard.

16. A method for processing information by a system comprising an information terminal, an information processing apparatus, and one or more devices that execute processing of data received from the information processing apparatus, the method comprising:

displaying a screen in which at least one piece of history information stored in a memory that stores therein history information that associates the device that executed the processing, the processed data, and identification of a conference session for which the processed data was created with each other, wherein the history information includes a specific image data file name or document file name that represents a piece of information that was outputted or processed during a conference session at a previous time, the history information being displayed and used for causing the device to execute processing based on the history information selected from the displayed at least one piece of history information;

generating instruction information for instructing the device to execute processing of data corresponding to the history information selected from the at least one piece of history information on the screen displayed at the displaying;

executing the processing of the data based on the instruction information generated at the generating; and recording the device that executed the processing and the processed data in the memory as the history information based on the instruction information for instructing the processing of the data executed at the executing.

17. An information processing apparatus connected to one or more devices that execute processing of received data and an information terminal via a network, the information processing apparatus comprising:

a memory configured to store therein history information that associates the device that executed the processing, the processed data, and identification of a conference session for which the processed data was created with each other, wherein the history information includes a specific image data file name or document file name that represents a piece of information that was outputted or processed during a conference session at a previous time; and processing circuitry configured to generate instruction information for instructing the device to execute processing of data corresponding to the history information selected from at least one piece of history information displayed on a screen in which at least one piece of information is displayed and be used for causing the device to execute processing based on the history information selected from the displayed at least one piece of history information; and record the device that executed the processing and the processed data in the memory as the history information based on the instruction information for instructing the processing of the data executed by a processing executing unit that executes the processing of the data based on the generated instruction information.

* * * * *